US012586940B2

(12) United States Patent
Zou et al.

(10) Patent No.: US 12,586,940 B2
(45) Date of Patent: Mar. 24, 2026

(54) ELECTRICAL CONNECTOR AND POWER TERMINAL

(71) Applicant: Amphenol Commercial Products (Chengdu) Co., Ltd., Chengdu (CN)

(72) Inventors: Chao Zou, Chengdu (CN); Yanming Cheng, Chengdu (CN)

(73) Assignee: Amphenol Commercial Products (Chengdu) Co., Ltd., Chengdu (CN)

(*) Notice: Subject to any disclaimer, the term of this patent is extended or adjusted under 35 U.S.C. 154(b) by 249 days.

(21) Appl. No.: 18/517,521

(22) Filed: Nov. 22, 2023

(65) Prior Publication Data

US 2024/0178594 A1 May 30, 2024

(30) Foreign Application Priority Data

Nov. 25, 2022 (CN) ......................... 202223148794.5

(51) Int. Cl.
*H01R 12/73* (2011.01)
*H01R 12/72* (2011.01)

(52) U.S. Cl.
CPC ......... *H01R 12/735* (2013.01); *H01R 12/721* (2013.01)

(58) Field of Classification Search
CPC .... H01R 12/735; H01R 12/721; H01R 12/58; H01R 13/245; H01R 13/2492; H01R 12/737
See application file for complete search history.

(56) References Cited

U.S. PATENT DOCUMENTS 7,637,783 B2 12/2009 Sasaoka et al.
7,985,097 B2 7/2011 Gulla
(Continued)

FOREIGN PATENT DOCUMENTS

CN 102804512 A 11/2012
CN 104103931 A 10/2014
(Continued)

OTHER PUBLICATIONS

[No Author Listed], New Product: High Density Plus (HD+) Card Edge Power Connectors. TE Connectivity. Nov. 27, 2018. 3 pages. URL:https://www.te.com/usa-en/about-te/news-center/new-hd-plus-card-edge-connectors.html [retrieved on May 18, 2021].
(Continued)

*Primary Examiner* — Travis S Chambers
(74) *Attorney, Agent, or Firm* — Wolf, Greenfield & Sacks, P.C.

(57) ABSTRACT

An electrical connector includes conductive terminals arranged to contact pads of a card inserted into the electrical connector. Each conductive terminal includes tiers of fingers configured to contact the card. The tiers of fingers include at least an outer tier of outer fingers and an inner tier of inner fingers. The outer tier may be parallel to the inner tier and may be parallel to a row direction. Contact surfaces of the outer fingers of the outer tier may be aligned in at least a first row parallel to the row direction. Contact surfaces of the inner fingers of the inner tier may be aligned in at least a second row different from and parallel to the first row. The conductive terminals may be arrayed along opposites sides of a card receiving slot so as to contact first and second sides of a card inserted into the slot.

20 Claims, 16 Drawing Sheets

(56) References Cited

U.S. PATENT DOCUMENTS

| | | | |
|---|---|---|---|
| 8,202,117 | B2 | 6/2012 | Pan |
| 8,480,434 | B2 | 7/2013 | Funayama et al. |
| 8,550,855 | B2 | 10/2013 | Zhang et al. |
| 8,672,713 | B2 | 3/2014 | Tajiri et al. |
| 8,840,406 | B2 | 9/2014 | Hirata |
| 9,054,456 | B2 | 6/2015 | Orris et al. |
| 9,070,990 | B2 | 6/2015 | Flickinger et al. |
| 9,160,105 | B2 | 10/2015 | Takaki |
| 9,160,122 | B2 | 10/2015 | Sato |
| 9,190,753 | B2 | 11/2015 | Takaki |
| 9,196,986 | B2 | 11/2015 | Tanaka et al. |
| 9,225,089 | B2 | 12/2015 | Sato |
| 9,236,678 | B2 | 1/2016 | Joo et al. |
| 9,287,654 | B2 | 3/2016 | Takaki |
| 9,608,349 | B2 | 3/2017 | Mashiyama et al. |
| 9,666,962 | B1 | 5/2017 | Bucher |
| 9,935,385 | B2 | 4/2018 | Phillips et al. |
| 9,941,613 | B2 | 4/2018 | Zhao |
| 9,966,679 | B2 | 5/2018 | Xu et al. |
| 10,096,920 | B2 | 10/2018 | Lee |
| 10,128,589 | B2 | 11/2018 | Yamaguchi |
| 10,637,175 | B1 | 4/2020 | Zou et al. |
| 10,873,146 | B2 | 12/2020 | Zou et al. |
| 11,626,681 | B2 | 4/2023 | Guo et al. |
| 2009/0170373 | A1 | 7/2009 | Pan |
| 2012/0252275 | A1 | 10/2012 | Tajiri et al. |
| 2017/0054241 | A1 | 2/2017 | Sato et al. |
| 2017/0373419 | A1 | 12/2017 | Lee |
| 2018/0034174 | A1 | 2/2018 | Yamaguchi |
| 2018/0097320 | A1 | 4/2018 | Hashiguchi |
| 2018/0191093 | A1 | 7/2018 | Phillips et al. |
| 2018/0212344 | A1 | 7/2018 | Li et al. |
| 2020/0161791 | A1 | 5/2020 | Zou et al. |
| 2020/0212616 | A1 | 7/2020 | Zou et al. |
| 2022/0013942 | A1 | 1/2022 | Guo et al. |
| 2023/0246373 | A1 | 8/2023 | Guo et al. |

FOREIGN PATENT DOCUMENTS

| | | | | | |
|---|---|---|---|---|---|
| CN | 205583210 | U | | 9/2016 | |
| CN | 205846279 | U | | 12/2016 | |
| CN | 106299769 | A | | 1/2017 | |
| CN | 206301977 | U | | 7/2017 | |
| CN | 206727256 | U | | 12/2017 | |
| CN | 207183596 | U | | 4/2018 | |
| CN | 207381578 | U | | 5/2018 | |
| CN | 109326909 | A | | 2/2019 | |
| CN | 208939193 | U | | 6/2019 | |
| CN | 213989301 | U | * | 8/2021 | |
| DE | 102017103604 | A1 | | 8/2017 | |
| DE | 102017213140 | A1 | | 2/2018 | |
| JP | 2016-110966 | A | | 6/2016 | |
| TW | 201223031 | A | * | 6/2012 | ......... H01R 13/6589 |
| TW | 201444187 | A | * | 11/2014 | |
| TW | M561346 | U | | 6/2018 | |
| WO | WO 2017/193684 | A1 | | 11/2017 | |
| WO | WO-2017201834 | A1 | * | 11/2017 | ............. H01R 12/00 |

OTHER PUBLICATIONS

Cheng et al., Terminal for Electrical Connector, Electrical Connector and Method of Manufacturing the Same, U.S. Appl. No. 17/994,505, filed Nov. 28, 2022.

* cited by examiner

FIG. 11A
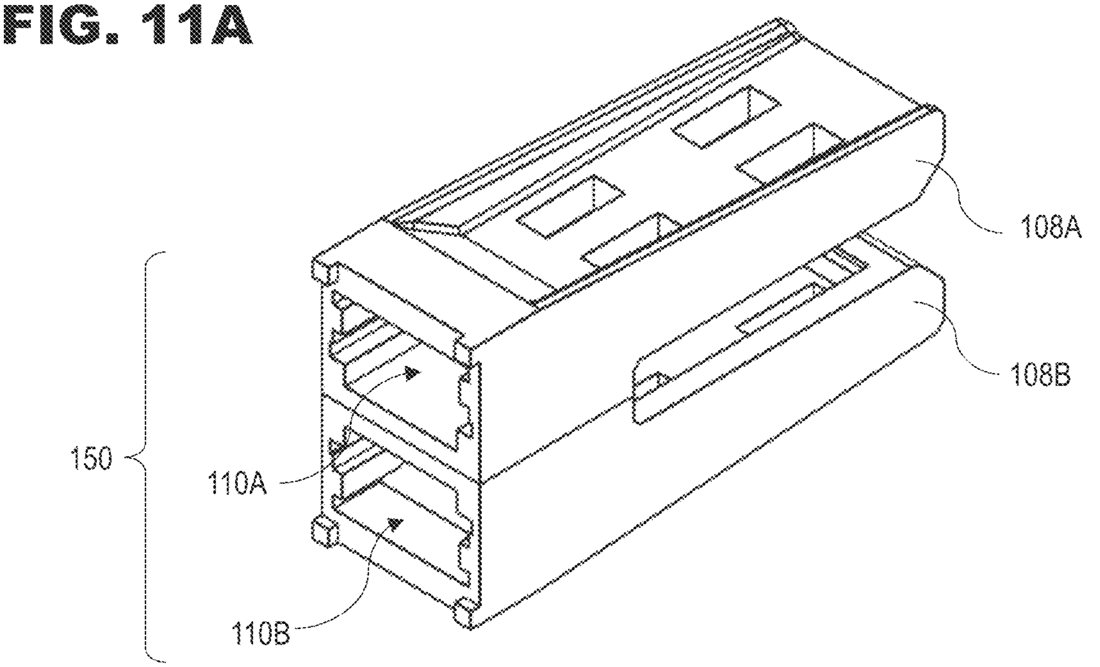
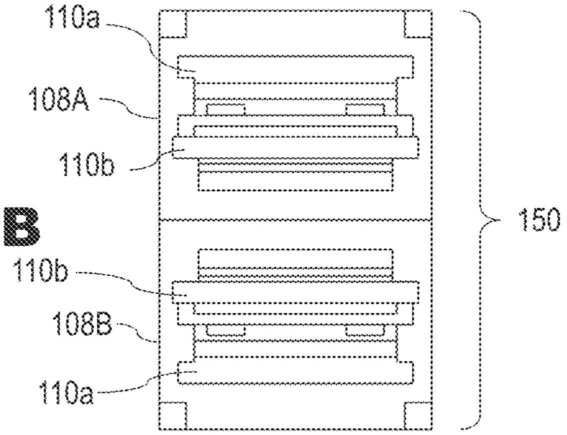
FIG. 11B
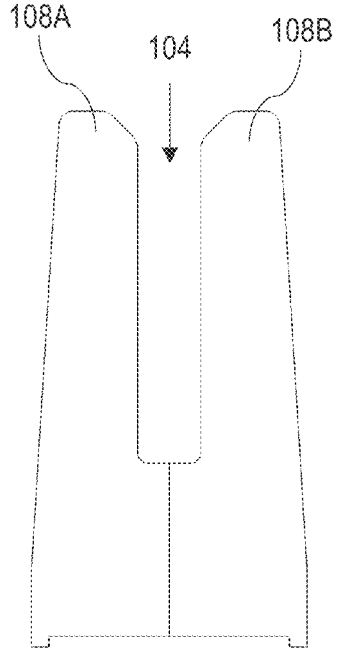
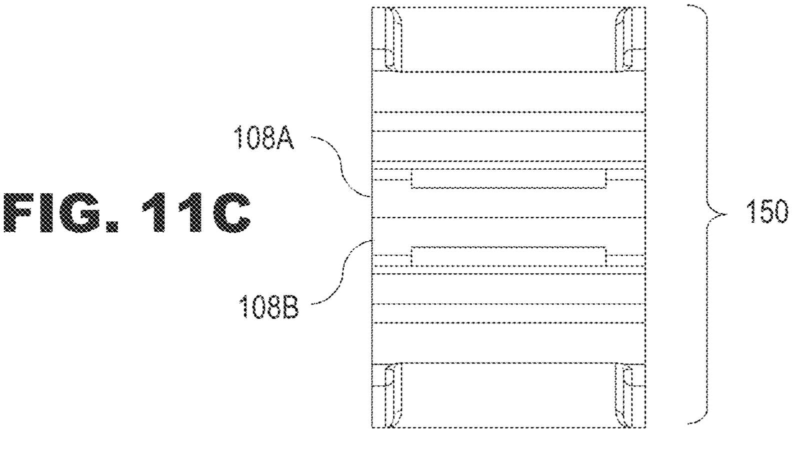
FIG. 11C
FIG. 11D

ELECTRICAL CONNECTOR AND POWER TERMINAL

CROSS REFERENCE TO RELATED APPLICATIONS

This application claims the benefit of priority under 35 U.S.C. § 119(a)-(d) of Patent Application No. 202211492624.0 filed in China on Nov. 25, 2022, and Utility Model Application No. 202223148794.5 filed in China on Nov. 25, 2022, both of which are incorporated by reference herein in their entireties.

FIELD OF THE DISCLOSURE

The technology disclosed herein relates generally to electrical interconnection systems and more specifically to high-density electrical power connectors and high-density terminals useable in such electrical power connectors.

BACKGROUND

Electrical connectors are used in many electrical systems. Electronic devices have been provided with assorted types of connectors whose primary purpose is to enable data, commands, power and/or other signals to pass between electronic assemblies. A connector that carries power is sometimes called a power connector. It is generally easier and more cost effective to manufacture an electrical system as separate electronic assemblies that may be joined with electrical connectors. For example, an electronic assembly may be implemented with a printed circuit board ("PCB"), which may be a card supporting at least one electrical component. The PCB may include wiring and/or one or more contact pads to which electrical components may be attached. The terms "card" and "PCB" may both be used herein to refer to such a structure.

In some scenarios, a two-piece connector is used to join two electronic assemblies. One connector may be mounted to each of the assemblies. The connectors may be mated, forming connections between the two assemblies.

In some other scenarios, a PCB may be joined directly to an electronic assembly via a one-piece electrical connector, which may be configured as a card-edge connector. The PCB may have conductive power pads along an edge that is designed to be inserted into the electrical connector, which may be attached to the electronic assembly. Conductive contacts within the electrical connector may contact the power pads of the PCB, thus electrically connecting the PCB to the electronic assembly. Card-edge-type connectors may mate with components other than a PCB, such as bar-type components that similarly have conductive outer surfaces (e.g., a bus bar and the like). The electrical connector may enable electrical power (e.g., electrical current and/or voltage) to be transferred to and from the PCB (or bus bar or similar component) and the electronic assembly. The terms "card connector" and "edge connector" and "card-edge connector" may be used herein to refer to such a connector with a mating interface that receives and mates to a PCB.

SUMMARY

According to an aspect of the present technology, an electrical connector is provided. The connector may comprise: an insulative housing comprising a slot configured to receive a removable mating component; and a plurality of conductive terminal assemblies comprising a plurality of contact surfaces and disposed in the housing such that the contact surfaces are exposed in the slot, each terminal assembly comprising a plurality of conductive terminal layers. Each of the terminal layers may comprise a plurality fingers disposed in a plurality of tiers including an outer tier and an inner tier, with contact points of the contact surfaces being disposed on the fingers, with the fingers including at least outer fingers disposed in the outer tier and inner fingers disposed in the inner tier, and with the outer tier and the inner tier being parallel to a row direction (X). The outer fingers of the outer tier may be interspersed such that an outer finger of a first terminal layer may be adjacent an outer finger of another one of the terminal layers. The inner fingers of the inner tier may be interspersed such that an inner finger of the first terminal layer may be adjacent an inner finger of another one of the terminal layers. First outer contact surfaces of the outer fingers of the outer tier of the first terminal layer may be aligned in at least a first row parallel to the row direction. Second outer contact surfaces of the outer fingers of the other terminal layers may be aligned in at least a second row parallel to the row direction. First inner contact surfaces of the inner fingers of the inner tier of the first terminal layer may be aligned in at least a third row parallel to the row direction. Second inner contact surfaces of the inner fingers of the other terminal layers may be aligned in at least a fourth row parallel to the row direction.

In some embodiments of this aspect, the first, second, third, and fourth rows may be different from each other.

In some embodiments of this aspect, the first row and the second row may be a same row comprising an outer row, and the third row and the fourth row may be a same row comprising an inner row different from the outer row.

In some embodiments of this aspect, the outer fingers and the inner fingers may be arranged in columns. Each column may extend parallel to a column direction (Y) and perpendicular to the row direction, and each column may comprise a finger of the first terminal layer and a finger of another one of the terminal layers.

In some embodiments of this aspect, each terminal assembly may comprise a conductive outer member positioned adjacent a first surface of the first terminal layer. The other terminal layers may comprise a second terminal layer positioned adjacent a second surface of the first terminal layer. In some embodiments, the outer member may be a support layer without a finger configured to contact the mating component when the mating component is inserted in the slot. In some embodiments, the outer member may be a third terminal layer comprising at least one finger configured with a contact surface that is exposed in the slot. In some embodiments, for each terminal assembly, the first terminal layer may comprise a first frame that forms at least part of a periphery of the first terminal layer, the second terminal layer may comprise a second frame that forms at least part of a periphery of the second terminal layer, and the first and second frames may be aligned with each other to form an outer frame of the terminal assembly.

In some embodiments of this aspect, the first frame may comprise a plurality of first alignment parts, and the second frame may comprise a plurality of second alignment parts configured to engage with the first alignment parts such that the first and second terminal layers are at a fixed position relative to each other. In some embodiments, the outer member may comprise a plurality of alignment parts configured to engage with the first alignment parts and/or the second alignment parts such that the outer member is at a fixed position relative to the first terminal layer and/or the second terminal layer. In some embodiments, the first alignment parts may be holes in the first frame, and the second alignment parts may be protrusions configured to extend into the holes. In some embodiments, the alignment parts of the outer member may be holes, the first alignment parts may be holes in the first frame, and the second alignment parts may be protrusions extending from a first surface of the second frame and configured to extend into the holes of the outer member and the holes of the first terminal layer.

In some embodiments of this aspect, the housing may comprise a plurality of terminal-slot portions configured to hold together the terminal layers of the terminal assemblies.

In some embodiments of this aspect, the housing may comprise a plurality of terminal compartments configured to house at least a portion of each terminal assembly. In some embodiments, each terminal compartment may comprise: an insertion end comprising a portion of the slot, and a tail end comprising a terminal-tail opening through which tail portions of the terminal assembly extend. In some embodiments, the tail portions of the terminal assembly may comprise: a plurality of first projections extending from the first frame, and a plurality of second projections extending from the second frame and configured to combine with the first projections to form a first row of mounting tails configured to be mounted on and electrically connected to a substrate board. The first row of mounting tails may extend from an inner portion of the terminal-tail opening. In some embodiments, the tail portions may comprise a plurality of outer projections extending from the outer member. The outer projections may be configured to form a second row of mounting tails parallel to the first row of mounting tails. The second row of mounting tails may extend from an outer portion of the terminal-tail opening.

According to another aspect of the present technology, an electrical connector is provided. The connector may comprise: an insulative housing comprising a slot configured to receive a removable mating component; a first row (Row A) of conductive terminal assemblies comprising a plurality of contact surfaces and disposed in the housing such that the contact surfaces of the first row are exposed in the slot; and a second row (Row B) of conductive terminal assemblies comprising a plurality of contact surfaces and disposed in the housing such that the contact surfaces of the second row are exposed in the slot. The first and second rows may comprise a plurality of pairs of terminal assemblies, with each pair of terminal assemblies including a terminal assembly of the first row facing a terminal assembly of the second row. Each terminal assembly of the first and second rows may comprise a plurality of fingers disposed in a plurality of tiers including an outer tier and an inner tier, with contact points of the contact surfaces of the first and second rows being disposed on the fingers, with the fingers including at least outer fingers disposed in the outer tier and inner fingers disposed in the inner tier, and with the outer tier and the inner tier being parallel to a row direction (X). The contact surfaces of the outer fingers of the outer tier may be aligned in at least one row parallel to the row direction. The contact surfaces of the inner fingers of the inner tier may be aligned in at least one other row different from and parallel to the at least one row.

In some embodiments of this aspect, the contact surfaces of the outer fingers of the outer tier may be aligned in two or more rows parallel to the row direction.

In some embodiments of this aspect, the contact surfaces of the inner fingers of the inner tier may be aligned in two or more rows parallel to the row direction.

In some embodiments of this aspect, for each pair of terminal assemblies, the terminal assembly of the first row may be a mirror image of the terminal assembly of the second row.

In some embodiments of this aspect, each terminal assembly of the first and second rows may comprise a plurality of conductive terminal layers. Each of the terminal layers may comprise a portion of the outer fingers of the outer tier and a portion of the inner fingers of the inner tier. The outer fingers of the outer tier may be interspersed such that an outer finger of a first terminal layer may be adjacent an outer finger of another one of the terminal layers. The inner fingers of the inner tier may be interspersed such that an inner finger of the first terminal layer may be adjacent an inner finger of another one of the terminal layers. In some embodiments, the outer fingers and the inner fingers may be arranged in columns, with each column extending parallel to a column direction (Y) and perpendicular to the row direction, and with each column comprising a finger of the first terminal layer and a finger of another one of the terminal layers.

In some embodiments of this aspect, each terminal assembly of the first and second rows may comprise a conductive outer member positioned adjacent a first surface of the first terminal layer. The other terminal layers may comprise a second terminal layer positioned adjacent a second surface of the first terminal layer. In some embodiments, for each terminal assembly of the first and second rows, the first terminal layer may comprise a first frame that forms at least part of a periphery of the first terminal layer, the second terminal layer may comprise a second frame that forms at least part of a periphery of the second terminal layer, and the first and second frames may be aligned with each other to form an outer frame of the terminal assembly. In some embodiments, the terminal layers of each terminal assembly of the first and second rows may be held together by grooves in the housing.

In some embodiments of this aspect, the housing may comprise first and second rows of terminal compartments configured to house the first and second row of terminal assemblies, respectively. The first and second rows of terminal compartments may comprise a plurality of pairs of terminal compartments housing the pairs of terminal assemblies. For each pair of terminal compartments, the terminal compartment of the first row of terminal compartments may be a mirror image of the terminal compartment of the second row of terminal compartments.

According to another aspect of the present technology, an electrical power terminal is provided. The terminal may comprise: a plurality of conductive terminal layers stacked on each other. Each terminal layer may comprise a plurality of fingers disposed in a plurality of tiers including an outer tier and an inner tier, with contact surfaces being disposed on the fingers, with the fingers including at least first fingers of a first tier and second fingers of a second tier, and with the first tier and the second tier being parallel to a row direction (X). The first fingers of the first tier may be interspersed such that a first finger of a first terminal layer may be adjacent a first finger of another one of the terminal layers. The second fingers of the second tier may be interspersed such that a second finger of the first terminal layer may be adjacent a second finger of another one of the terminal layers. The contact surfaces of the first fingers of the first tier of the first terminal layer may be aligned in at least a first row parallel to the row direction. The contact surfaces of the first fingers of the other terminal layers may be aligned in at least a second row parallel to the row direction. The contact surfaces of the second fingers of the second tier of the first terminal layer may be aligned in at least a third row parallel to the row direction. The contact surfaces of the second fingers of the other terminal layers may be aligned in at least a fourth row parallel to the row direction.

In some embodiments of this aspect, the first, second, third, and fourth rows may be different from each other.

In some embodiments of this aspect, the first row and the second row may be a same row comprising an outer row, and the third row and the fourth row may be a same row comprising an inner row different from the outer row.

In some embodiments of this aspect, the first fingers and the second fingers may be arranged in columns, with each column extending parallel to a column direction (Y) and perpendicular to the row direction, and with each column comprising a finger of the first terminal layer and a finger of another one of the terminal layers.

In some embodiments of this aspect, the terminal may further comprise a conductive member positioned adjacent a first surface of the first terminal layer. The other terminal layers may comprise a second terminal layer positioned adjacent a second surface of the first terminal layer.

In some embodiments of this aspect, the first terminal layer may comprise a first frame that forms at least part of a periphery of the first terminal layer, the second terminal layer may comprise a second frame that forms at least part of a periphery of the second terminal layer, and the first and second frames may be aligned with each other to form an outer frame of the power terminal. In some embodiments, the first frame may comprise a plurality of first alignment parts, and the second frame may comprise a plurality of second alignment parts configured to engage with the first alignment parts such that the first and second terminal layers are at a fixed position relative to each other. In some embodiments, the member may comprise a plurality of alignment parts configured to engage with the first alignment parts and/or the second alignment parts such that the member is at a fixed position relative to the first terminal layer and/or the second terminal layer.

In some embodiments of this aspect, the first alignment parts may be holes in the first frame, and the second alignment parts may be protrusions configured to extend into the holes. In some embodiments, the alignment parts of the member may be holes, the first alignment parts may be holes in the first frame, and the second alignment parts may be protrusions extending from a first surface of the second frame and configured to extend through the holes of the first terminal layer into the holes of the member. In some embodiments, the terminal may further comprise a connector configured to hold the terminal layers together. The connector may be a metal part or an insulative part. In some embodiments, the terminal may further comprise a plastic part molded around a portion of the terminal layers to hold together the terminal layers.

In some embodiments of this aspect, a plurality of first projections may extend from the first frame, a plurality of second projections may extend from the second frame, and the plurality of first projections may combine with the plurality of second projections to form a first row of mounting tails. In some embodiments, a plurality of third projections may extend from the member and may form a second row of mounting tails parallel to the first row of mounting tails. In some embodiments, the member may comprise: a bar portion from which the third projections extend, a base portion comprising an external side and an internal side, with the internal side being configured to contact a first surface of the first terminal layer, and a sloped portion connecting the base portion and the bar portion, such that the base portion extends in a first plane, and such that at least a portion of each of the third projections extends in a second plane different from the first plane.

In some embodiments of this aspect, each of the first fingers of the first terminal layer may comprise: a first elongated portion attached to and coplanar with the first frame, and a first free end extending from the first elongated portion, the first free end being curved and having a convex side bearing one of the contact surfaces of the first fingers. Each of the second fingers of the second terminal layer may comprise: a second elongated portion attached to and coplanar with the second frame, and a second free end extending from the second elongated portion, the second free end being curved and having a convex side bearing one of the contact surfaces of the second fingers.

In some embodiments of this aspect, the member may comprise a third terminal layer of the other terminal layers. The member may comprise at least one third finger having contact a surface. The at least one third finger may comprise: a third elongated portion attached to and coplanar with the base portion, and a third free end extending from the third elongated portion, the third free end being curved and having a convex side bearing the contact surface of the at least one third finger.

Features described herein may be used, separately or together in any combination, in any of the embodiments discussed herein. For example, a feature described for an embodiment may be incorporated in another embodiment even though the feature may not be explicitly described for the other embodiment.

BRIEF DESCRIPTION OF DRAWINGS

Various aspects and embodiments of the present technology disclosed herein are described below with reference to the accompanying figures. It should be appreciated that the figures are not necessarily drawn to scale. Items appearing in multiple figures may be indicated by the same reference numeral. For the purposes of clarity, not every component may be labeled in every figure.

FIGS. 8A through 8G show views of a first terminal layer of the terminal of FIGS. 7A and 7B, according to some embodiments of the present technology, of which FIG. 8A is a tail-end perspective view showing a first side, FIG. 8B is a plan view of a right side, FIG. 8C is a tail-end perspective view showing a second side that faces away from the first side, FIG. 8D is a plan view of the first side, FIG. 8E is a plan view of the second side, FIG. 8F is a plan view of a bottom or tail side, and FIG. 8G is a plan view of a top or insertion side.

FIGS. 9A through 9G show views of a second terminal layer of the terminal of FIGS. 7A and 7B, according to some embodiments of the present technology, of which FIG. 9A is a tail-end perspective view showing a first side that faces the second side of the first terminal layer, FIG. 9B is a plan view of a right side, FIG. 9C is a tail-end perspective view of a second side that faces away from the first side, FIG. 9D is a plan view of the first side, FIG. 9E is a plan view of the second side, FIG. 9F is a plan view of a bottom or tail side, and FIG. 9G is a plan view of a top or insertion side.

FIGS. 10A through 10D show views of an outer layer of the terminal of FIGS. 7A and 7B, according to some embodiments of the present technology, of which FIG. 10A is a tail-end perspective view of an external side, FIG. 10B is a plan view of a right side, FIG. 10C is a plan view of a tail side, and FIG. 10D is a plan view of an insertion side.

FIG. 11A through 11D show views of a pair of terminal compartments of the housing of FIG. 5, according to some embodiments of the present technology, of which FIG. 11A is a perspective view of a bottom side, FIG. 11B is a plan view of the bottom side, FIG. 11C is a plan view of a top side, and FIG. 11D is a plan view of a right side or a left side.

FIGS. 12A through 12F show views of a terminal compartment of the pair of terminal compartments of FIGS. 11A through 11D, according to some embodiments of the present technology, of which FIG. 12A is a perspective view of the bottom side showing an internal side, FIG. 12B is a perspective of the bottom side showing an external side, FIG. 12C is a plan view of the internal side, FIG. 12D is a plan view of the external side, FIG. 12E is a perspective view of the bottom side showing a bottom portion of an internal structure, and FIG. 12F is a perspective view of the top side showing a top portion of the internal structure.

DETAILED DESCRIPTION

Figure 1A:
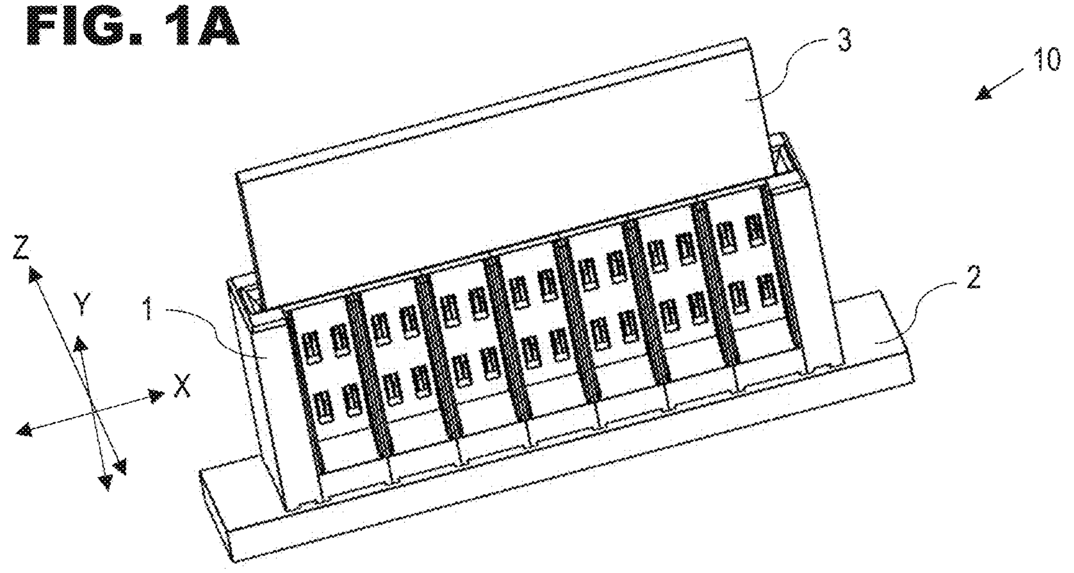
FIG. 1A shows a top perspective view of a card (e.g., a PCB) inserted in an electrical connector that is mounted on a substrate, according to some embodiments of the present technology.

Structures of electrical connectors and connector terminals able to carry electrical power are of great importance to electrical systems that may require high-power operation and/or a small size. Many electrical systems may be complex and may require power to be provided to a large number of components. However, some electrical systems have been miniaturized, getting smaller and smaller in size due to, e.g., consumer demand for portable electronics and/or electronics that do not take up much space in, e.g., a small apartment or a small office. Miniaturization can present difficulties in providing a same number of power connections as a conventional-sized connector, but in smaller and smaller amounts of space. That is, as the size of a connector is reduced to fit in a smaller electronic assembly, it becomes more and more difficult to maintain the same number of power connections or contacts in the connector.

The inventors have recognized and appreciated the challenges associated with miniaturization of electrical connectors and have developed techniques to provide a connector with terminals configured to provide contacts on one side or both sides of a card (e.g., a PCB) inserted in the connector. In some examples, these terminals may include multiple tiers of contacts with each tier extending parallel to an insertion edge of the card when the card is inserted in the connector. As described herein, various embodiments of the connector may include terminals arranged to provide a plurality of contacts for contacting a first side of the card. These contacts may include a row of contacts in a first tier, a row of contacts in a second tier parallel to the first tier, etc. The connector also may include terminals arranged to provide a plurality of contacts for contacting a second side of the card. These terminals also may include a row of contacts in a first tier, a row of contacts in a second tier parallel to the first tier, etc. As will be appreciated, the terminals on either or both sides of card may have more than two tiers of contacts.

The techniques described herein may be used advantageously to increase the density of contacts of a connector without increasing the width of the connector's card-insertion opening. by providing contacts in multiple tiers that extend parallel to an insertion edge of a card inserted in the connector.

Moreover, the terminals may be configured to carry a relatively large amount of current without a large temperature increase. In some examples, each of the terminals may be formed with layers, such as may result from forming each layer from a sheet of metal. The contacts forming each of the multiple tiers may be stamped in such a sheet of metal. The contacts for each layer may be stamped in a staggered fashion such that, when the layers are stacked one on top of another, at each tier contacts from one layer are interleaved with contacts of another layer.

Two or more layers may be formed with projections that align when the layers are stacked one on top of the other. Each projection may have a thickness that is less than the thickness of a mounting pin or other tail for attaching the terminal to a PCB. The aligned projections may combine to form tails for the terminals, such as mounting pins which may be inserted into holes in a PCB for mounting the connector.

Optionally, a terminal may include a layer that provides an additional current flow path into a PCB. Such an additional layer, for example, may have a portion that attaches to other layers with contacts and a portion that bends away from the layers with contacts and includes tails for mounting to a PCB. Such a configuration creates separation in mounting locations for the tails.

As a specific example, a first layer and a second layer of a terminal may each have rows of contacts that are interleaved in two or more tiers. Projections of the first and second layers may combine to form tails for mounting to a PCB. Each of the first and second layers may be made from a sheet of metal with a thickness half the width of the tail. A third layer, which may be made from a sheet of metal approximately twice the thickness of the first or second layer, may including mounting tails that are offset in a direction perpendicular to the rows of contacts from the tails for the first and second layers.

The inventors have recognized and appreciated designs for a high-density electrical power connector able to interconnect electronic assemblies with a same number of contacts in a smaller amount of space than a conventional connector or with a larger number of contacts in the same amount of space as a conventional connector. Various connector designs disclosed herein may be suitable for miniaturized electronic systems in which power is required by a large number of electronic components in relatively small spaces. These designs include adaptations to card connectors that support large power-flow through small spaces without undesired effects (e.g., without an increase in heat generation).

In some embodiments of the present technology, an electrical connector may be provided for connecting multiple rows of contact pads on a card (e.g., a PCB or another type of component with conductive outer surfaces) with conductive wiring of a circuit-board substrate on which the connector may be mounted. In some embodiments, a connector may comprise contact portions configured to contact multiple rows of contact pads located on one side of the card, when the card is inserted in the connector. In some embodiments, a connector may comprise contact portions configured to contact both sides of the card, with multiple rows of contact pads being located one each side of the card.

In some embodiments of the present technology, an electrical connector may include a plurality of conductive terminals. Each terminal may be configured to provide a plurality contacts arrayed in tiers, with each tier including a plurality of contacts and with the tiers being arranged parallel to each other. In some embodiments, the tiers may be parallel to an insertion edge of a card inserted in the connector. With such an arrangement, the connector may contact not merely a row of contacts pads arranged in a line along an outer edge on one side or on both sides of the card, but may contact a two-dimensional array of contact pads on one side or on both sides of the card.

In some embodiments of the present technology, a card connector having a length (X direction in FIG. 1A) in a range of 40 mm to 41 mm, a height (Y direction) in a range of 15 mm to 16 mm (from a top surface of an insulative housing to a bottom surface of the housing), a width (Z direction) in a range of 7 mm to 8 mm may have at over 220 contact surfaces ("contacts") each configured to make contact with a different spot of a card inserted in the connector. In some embodiments, the connector may have 112 contacts configured to make contact with a first side of the card, and 112 contacts configured to make contact with a second side of the card.

In some embodiments of the present technology, each terminal of the connector may comprise an assembly of multiple conductive terminal layers. In some embodiments, the terminal layers may be held together by molded plastic or by a metal holder or by another type of holder. In some embodiments, the terminal layers may be held together only by surfaces of an insulative housing of the connector, without the need for a plastic molding or other holding means to hold the terminals together. In some embodiments, the terminals may be arranged in pairs of first and second terminals configured to electrically contact both sides of a card inserted in the connector. In some embodiments, the first terminal may be a mirror image of the second terminal, and each of the first and second terminals may include multiple tiers of contacts for contacting arrays of contact pads on the card simultaneously.

Figure 1B:
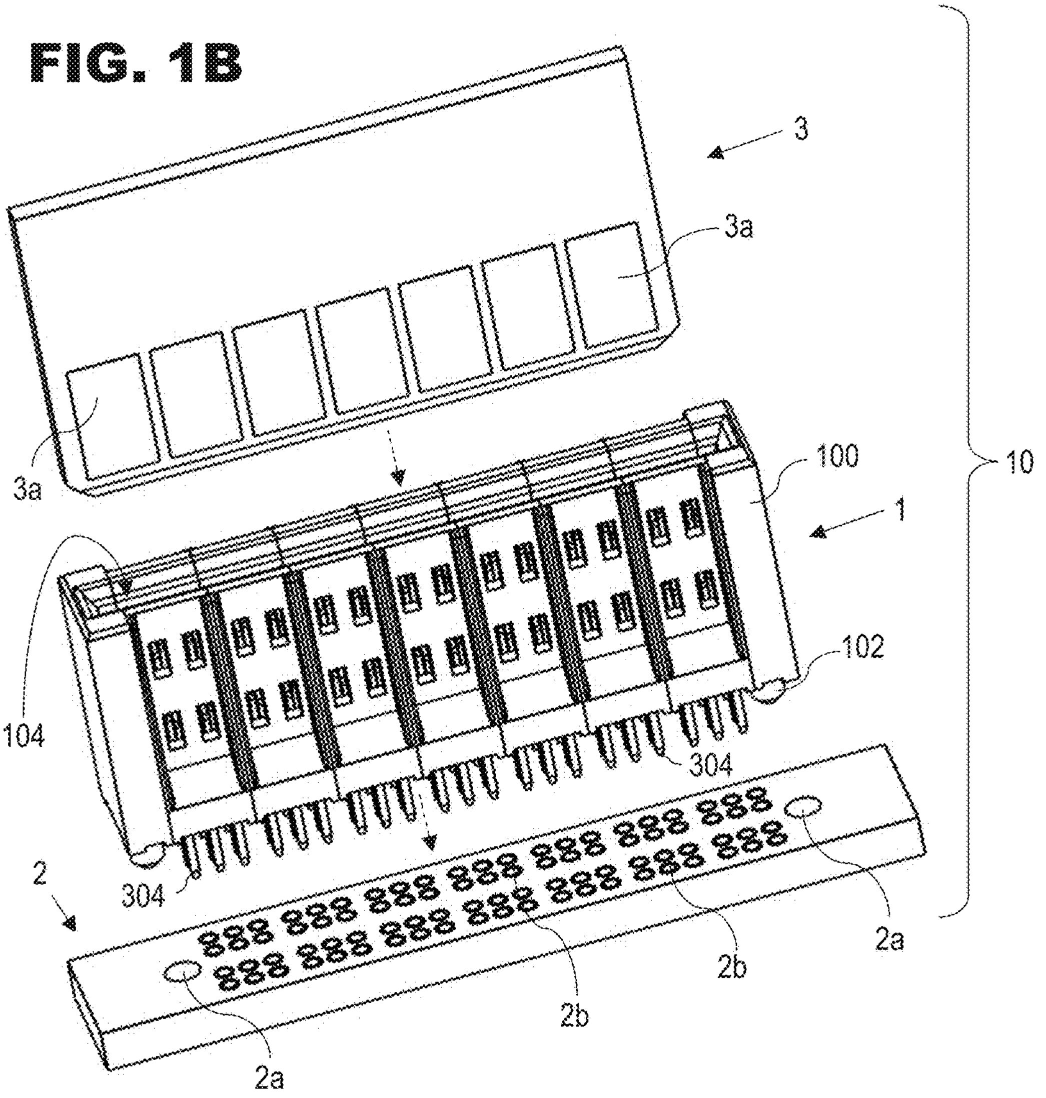
FIG. 1B shows the card, the connector, and the substrate of FIG. 1A separated from each other, according to some embodiments of the present technology.

Turning now to the figures, FIG. 1A shows a top perspective view of an assembly 10 of a card 3 (e.g., a PCB) inserted in an electrical connector 1 that is mounted on a substrate 2, according to some embodiments of the present technology. FIG. 1B shows the assembly 10 of the card 3, the connector 1, and the substrate 2 separated from each other. In FIG. 1B, the dashed arrows indicate insertion directions of the card 3 into the connector 1 and the connector 1 into the substrate 2. The insertion directions may be parallel to the Y direction of the connector 1. The card 3 may comprise a plurality of electrically conductive contact regions 3*a* positioned on one surface or both surfaces of the card 3 at or near an insertion edge of the card 3. In some embodiments, one or more of the contact regions 3*a* on one side or on both sides of the card 3 may comprise a single contact pad. In some embodiments, one or more of the contact regions 3*a* may comprise a plurality of contact pads (not shown). In some embodiments, one or more of the contact regions 3*a* may comprise a two-dimensional array of contact pads. For example, the array may comprise tiers of contact pads arranged in parallel to the insertion edge of the card 3. According to some embodiments, the contact pads of the contact regions 3*a* may be configured to transfer power to the connector 1 from electrical wiring (not shown) of the card 3 and/or may be configured to transfer power from the connector 1 to other electronic components via electrical wiring (not shown) of the card 3. For example, the card 3 may comprise power planes in which conductive traces or wiring may be present for routing electrical current and/or voltage to components of an electronic system in which the connector 1 and the card 3 are deployed. The components attached to the card 3 may consume power that is delivered to the contact regions 3*a* of the card 3 through electrically conductive power terminals 300 of the connector 1 in contact with the contact regions 3*a*. In another example, the components attached to the contact regions 3*a* of the card 3 may condition or otherwise deliver power through the contact regions 3*a* to the terminals 300 of the connector 1, where the power can then be routed to other components in an electronic system connected to the terminals 300. Regardless of the direction in which power is flowing, onto or off of the card 3 through the connector 1, techniques as described herein may be applied to the connector 1 to enable the terminals 300 to transfer power through a high density of contacts.

Figure 2A:
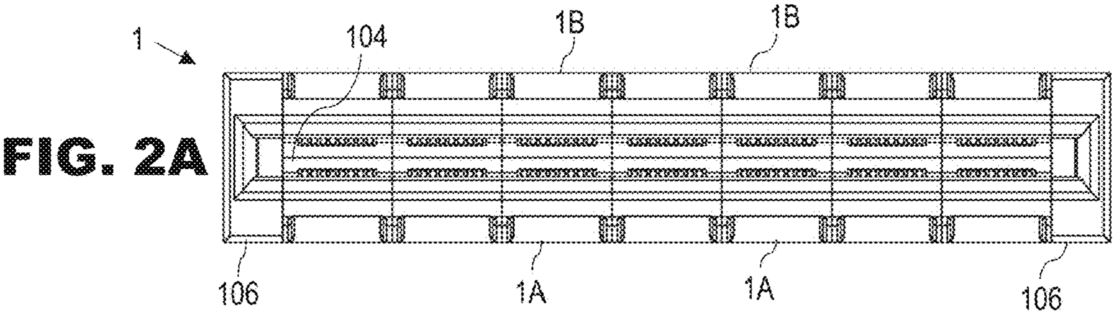
FIG. 2A shows plan view of a top side of an electrical connector, according to some embodiments of the present technology.
Figure 2B:
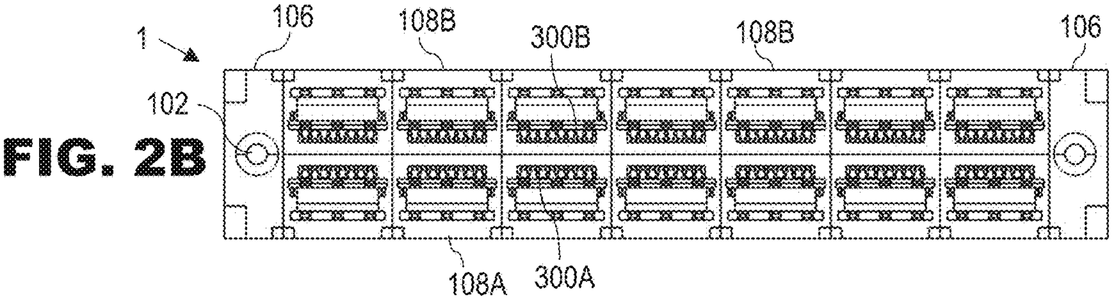
FIG. 2B shows a plan view of a bottom side the connector of FIG. 2A, according to some embodiments of the present technology.
Figure 2C:
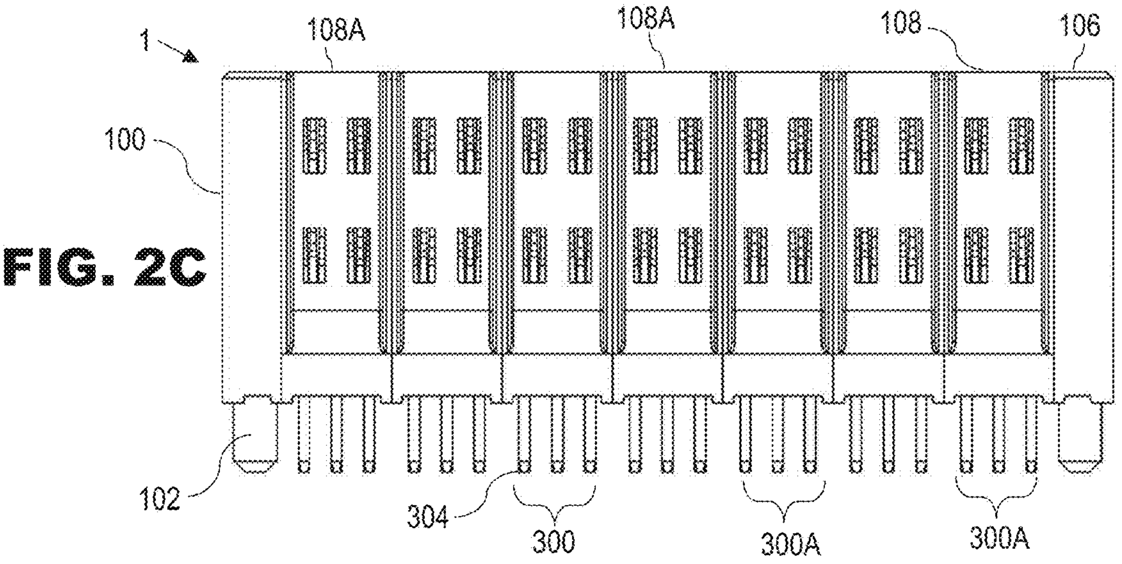
FIG. 2C shows plan view of a front side or a rear side of the connector of FIG. 2A. according to some embodiments of the present technology.
Figure 2D:
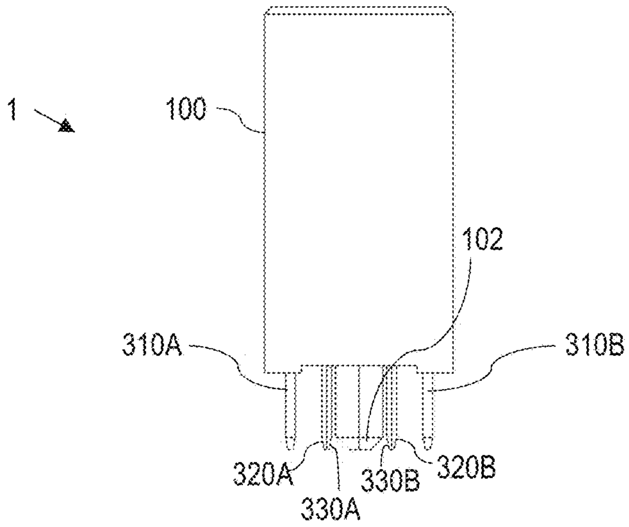
FIG. 2D shows a plan view of a left side or a right side the connector of FIG. 2A, according to some embodiments of the present technology.
Figure 3A:
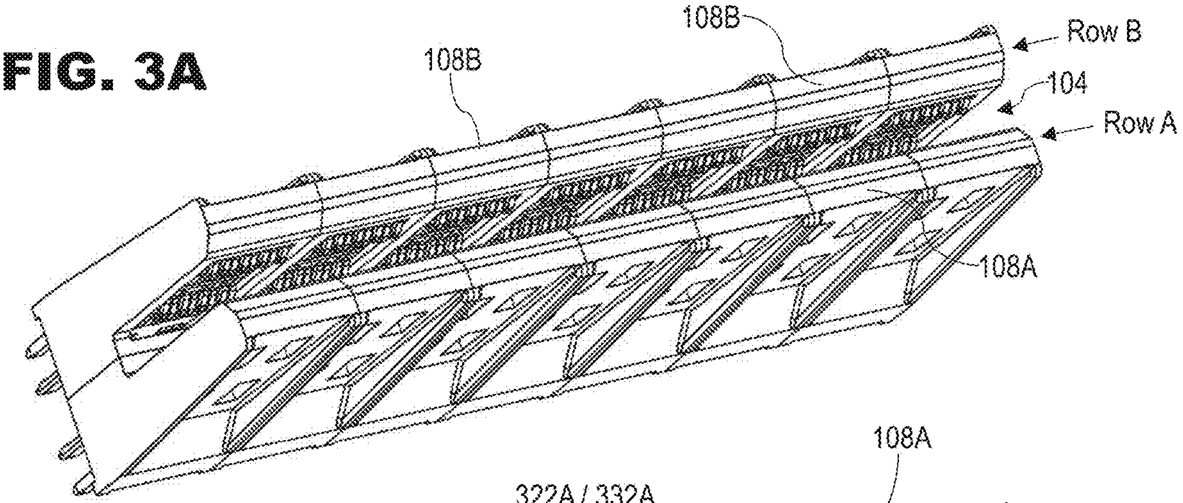
FIG. 3A shows a top perspective view of the connector of FIG. 2A with end portions of the connector removed, according to some embodiments of the present technology.
Figure 3B:
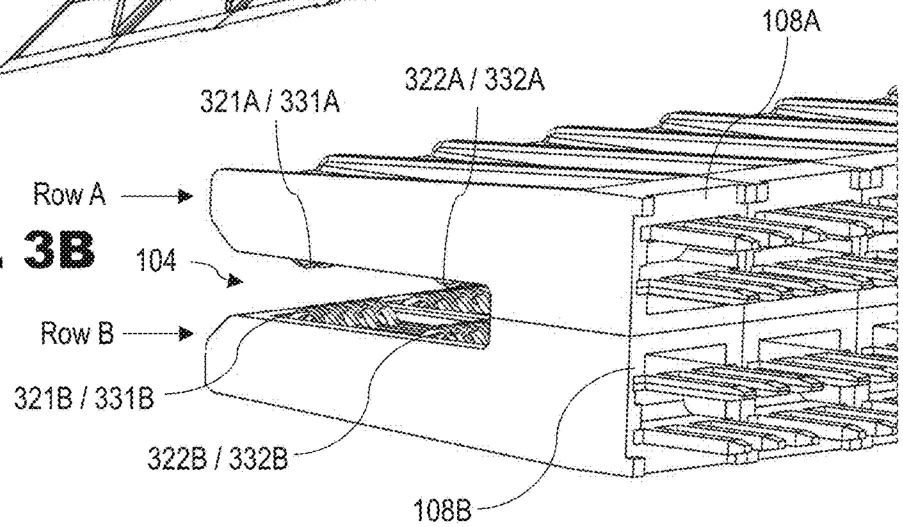
FIG. 3B shows a bottom perspective view of a portion of the connector of FIG. 2A, according to some embodiments of the present technology.
Figure 3C:
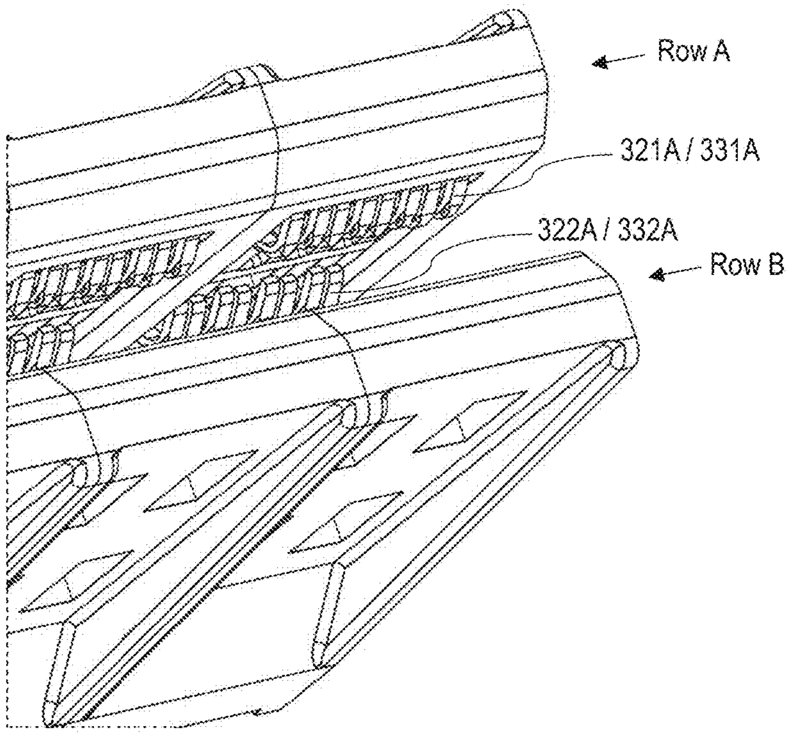
FIG. 3C shows a top perspective view of a portion of the connector of FIG. 2A, according to some embodiments of the present technology.

FIGS. 2A through 2D show views of the connector 1, according to some embodiments of the present technology, of which FIG. 2A shows plan view of a top side, FIG. 2B shows a plan view of a bottom side, FIG. 2C shows plan view of a front side or a rear side, and FIG. 2D shows an plan view of a left side or a right side. The connector may comprise an insulative housing 100 configured to hold at least one row of the terminals 300. FIGS. 3A through 3C show views of the connector 1 with end portions 106 of the housing 100 removed, of which FIG. 3A show a top perspective view, FIG. 3B shows a bottom perspective view.

FIG. 3C shows an enlarged top perspective view of a portion of the connector 1. The end portions 106 of the housing 100 may each comprise an anchor peg 106 configured to be inserted in a corresponding anchor-peg hole 2*a* in the substrate 2. The terminals 300 may each comprise mounting tails 304 configured to be inserted in corresponding terminal-tail holes 2*b* in the substrate 2.

According to some embodiments of the present technology, the connector 1 may comprise a card-insertion opening 104, which may be an elongated slot configured to receive and accommodate a portion of the card 3 when the card 3 and the connector 1 are mated together. On a first side of the card-insertion opening 104 may be arranged a row, Row A, of connector segments 1A. Each connector segment 1A may comprise a terminal 300 (designated 300A for Row A) housed in a terminal compartment 108 (designated 108A for Row A) of the housing 100. The terminals 300A may be configured to contact and transmit power to/from contact pads on a first side of the card 3. In some embodiments, a second row, Row B, of connector segments 1B may be arranged on a second side of the card-insertion opening 104 may opposite to the first side. Each connector segment 1B may comprise a terminal 300B housed in a terminal compartment 108B of the housing 100. The terminals 300B may be configured to contact and transmit power to/from contact pads on a second side of the card 3. As depicted in FIG. 2A, the two end portions 106 of the housing 100 may each join an end of Row A with an end of Row B. In some embodiments, each end portion 106 may comprise an end portion of the card-insertion opening 104. In some embodiments, the terminals 300A, 300B may be structurally identical to each other and may be referred to individually with the reference numeral "300." In some embodiments, the terminal compartments 108A, 108B may be structurally identical to each other and may be referred to individually with the reference numeral "108." In some embodiments, the connector 1 may be reversible, such that a front half of the connector 1 may be structurally the same as a rear half of the connector. In some embodiments, Row A may be a mirror image of Row B, as depicted in FIGS. 2A through 2D.

According to some embodiments of the present technology, the connector 1 may have a modular construction such that each of the connector segments 1A, 1B may be a module of the connector 1. In some embodiments, the modules of the connector segments 1A may be joined together to form Row A, the modules of the connector segments 1B may be joined together to form Row B, and the end portions 106 may be end modules joined to the ends of Row A and Row B to form the connector 1.

Figure 4A:
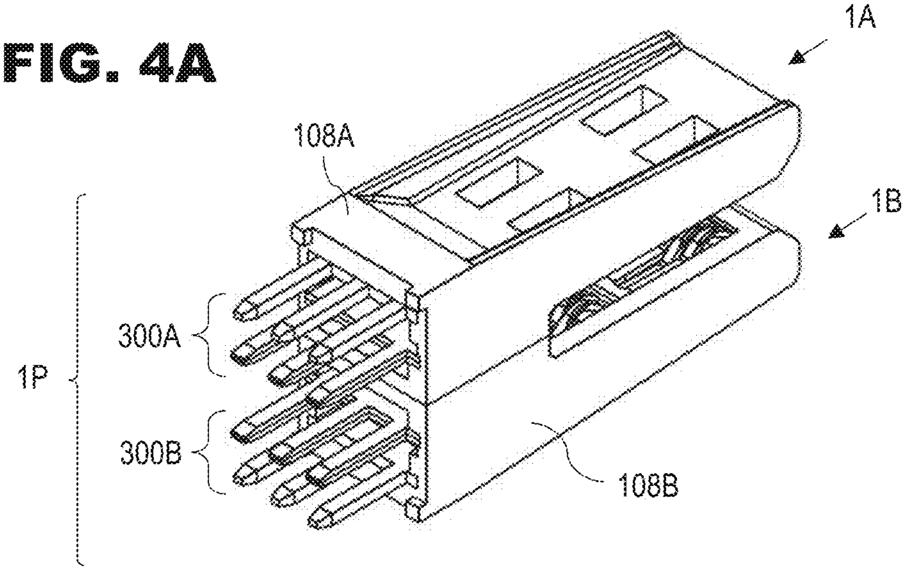
FIG. 4A shows a perspective view of a pair of connector modules, according to some embodiments of the present technology.
Figure 4B:
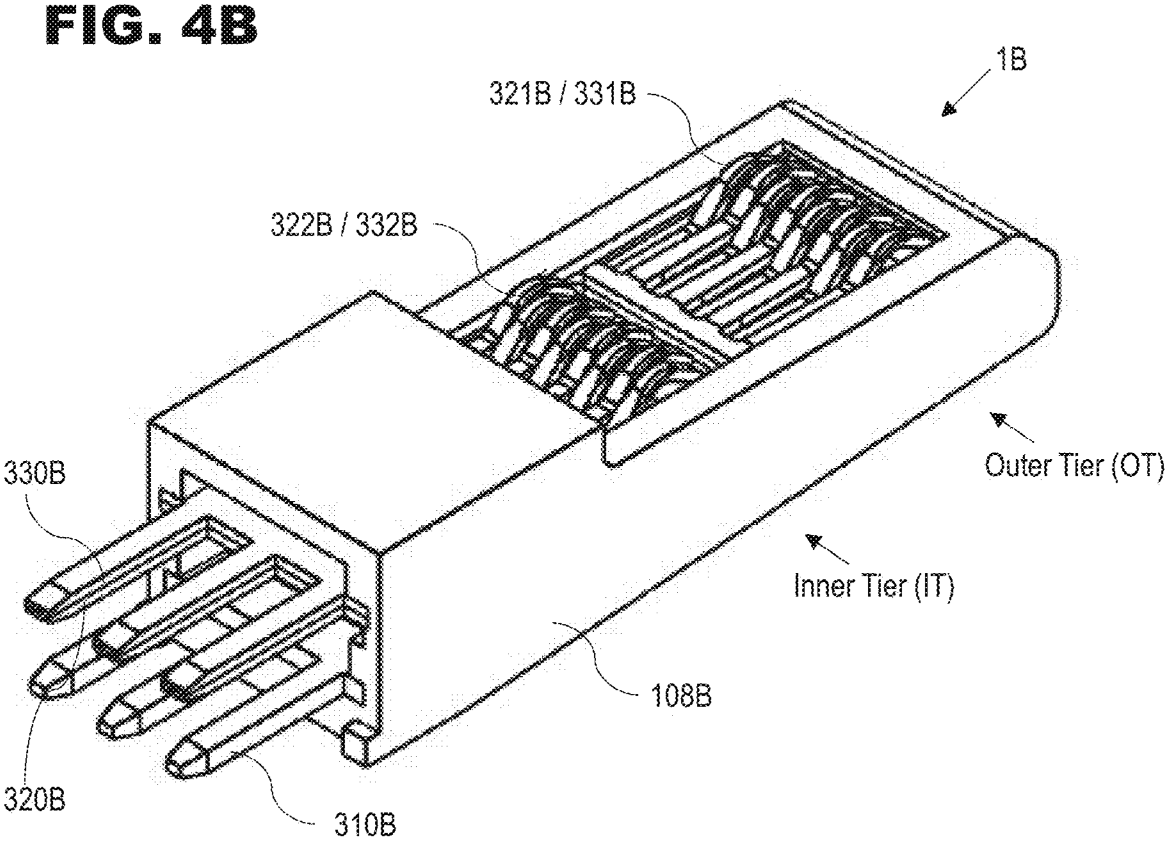
FIG. 4B shows one of the connector modules of FIG. 4A, according to some embodiments of the present technology.

In some embodiments of the present technology, the connector 1 may be configured as a plurality of pairs 1P of connector modules, with each pair 1P including a module of the connector segment 1A and a module of the connector segment 1B, as depicted in the perspective view of FIG. 4A. FIG. 4B shows an embodiment of the connector segment 1B forming half of the pair 1P of connector modules of FIG. 4A. As noted above, Row A and Row B may be mirror images of each other. Therefore, although FIG. 4B refers to the connector segment 1B, the connector segment 1A may have an equivalent structure and therefore will not be described separately herein. As described below and elsewhere herein, the terminals 300 (300A, 300B) of the connector 1 may each comprise a plurality of members 310, 320, 330 two or more of which may be configured as layers that, when assembled together, provide a plurality of tiers of fingers 321, 322, 331, 332. Each finger 321, 322, 331, 332 may include a contact surface configured to contact and transmit power to/from the card 3. Although FIG. 4B depicts two tiers: an outer tier OT (OT-A (not shown), OT-B) comprised of outer-tier fingers 321, 331 and an inner tier IT (IT-A (not shown), IT-B) comprised of inner-tier fingers 322, 332, it should be appreciated that in some embodiments there may be more than two tiers of fingers. Such embodiments may not be illustrated in the drawings but may be constructed based on the technology disclosed herein.

Figure 5:
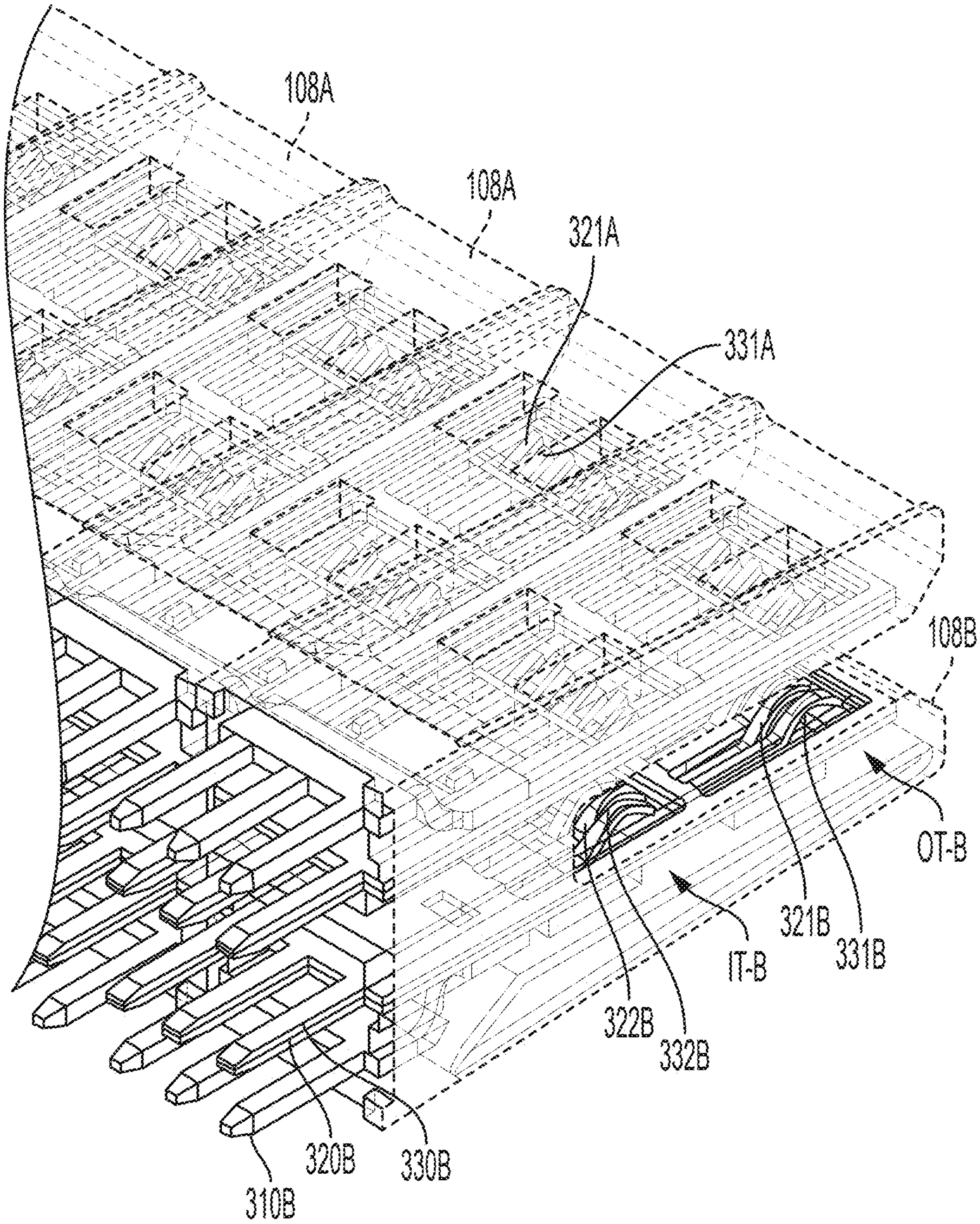
FIG. 5 shows a bottom perspective of a portion of the connector of FIG. 2A with a housing of the connector appearing translucent to show an arrangement of terminals in the housing, according to some embodiments of the present technology.

FIG. 5 shows a bottom perspective of a portion of the connector 1, with the housing 100 appearing translucent to show an arrangement of the terminals 300A, 300B in the housing 100, according to some embodiments of the present technology. In some embodiments, the terminal 300 (300A, 300B) may comprise a first conductive terminal layer 320 (320A, 320B) and a second conductive terminal layer 330 (330A, 330B). It should be understood that the term "conductive" as used herein means electrically conductive, and the term "insulative" as used herein means electrically insulative. As described below, each of the first and second conductive layers 320, 330 includes multiple tiers of fingers. For example, the first terminal layer 320 may comprise the outer-tier fingers 321 (321A, 321B) and the inner-tier fingers 322 (322A, 322B), and the second terminal layer 330 may comprise the outer-tier fingers 331 (331A, 331B) and the inner-tier fingers 332 (323A, 332B). The tiers OT, IT may be parallel to each other and parallel to a top edge of the card-insertion opening 104. In some embodiments, the terminal 300 may comprise a third layer 330 (330A, 330B), which may be formed of a conductive material or an insulative material. The third layer 330 may serve as a support layer for the terminal 300. In some embodiments, the third layer 330 may not include a surface configured to contact the card 3 directly when the card is inserted in the card-insertion opening 104. For example, the third layer 330 may not include a finger configured to contact the card 3 to transmit power to/from the card 3. In some embodiments, the first terminal layer 320 may be sandwiched between the second terminal layer 330 and the third layer 310.

Figure 6:
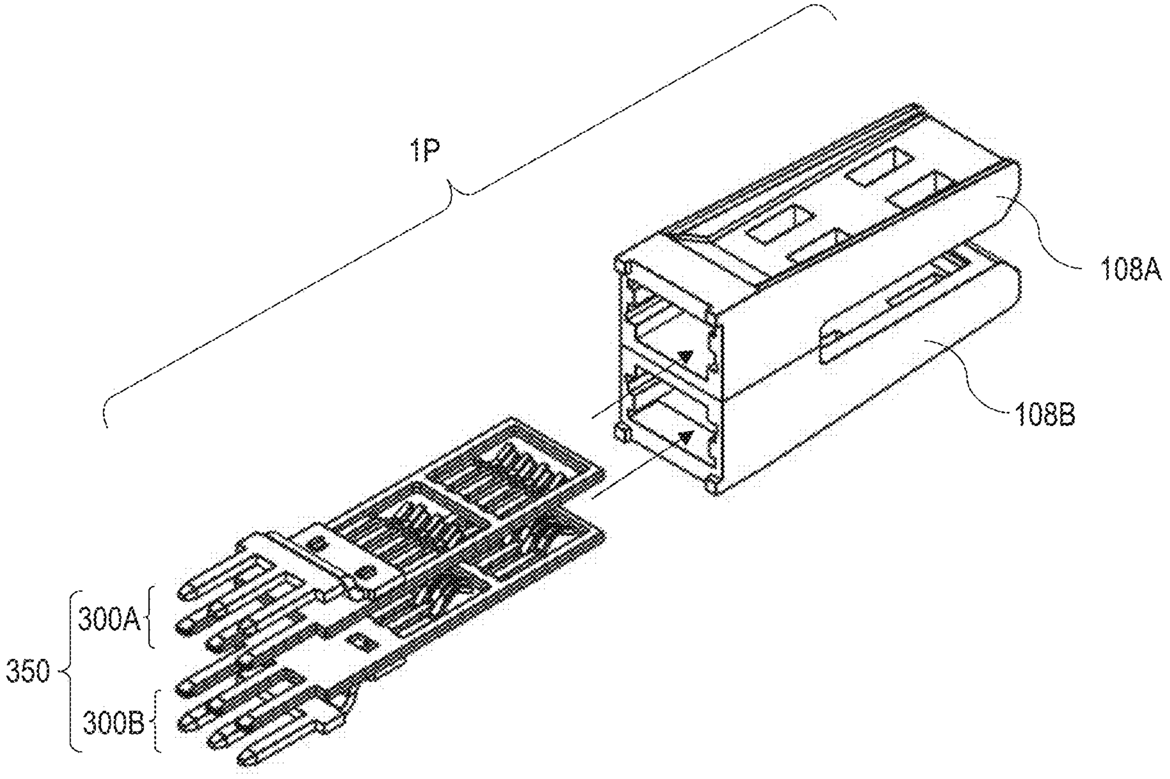
FIG. 6 shows a bottom perspective view of the pair of connector modules of FIG. 4A in a partially disassembled state, according to some embodiments of the present technology.

FIG. 6 shows a bottom perspective view of the pair 1P of connector modules of FIG. 4A in a partially disassembled state, showing a pair 350 of terminals 300A, 300B. In some embodiments of the present technology, there may be mirror symmetry of the terminal 300A relative to the terminal 300B. In some embodiments, there may be mirror symmetry of the terminal compartment 108A relative to the terminal compartment 108B.

Figure 7A:
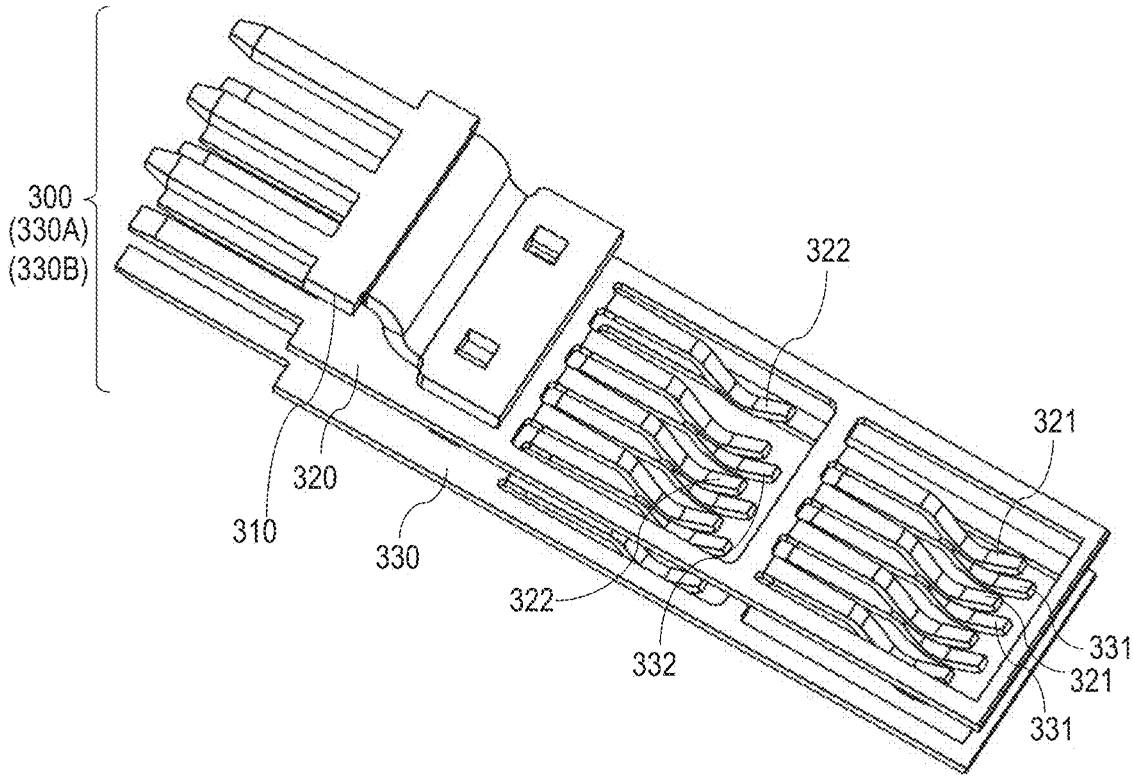
FIGS. 7A and 7B each show a perspective view of a terminal in a disassembled state, according to some embodiments of the present technology.
Figure 7B:
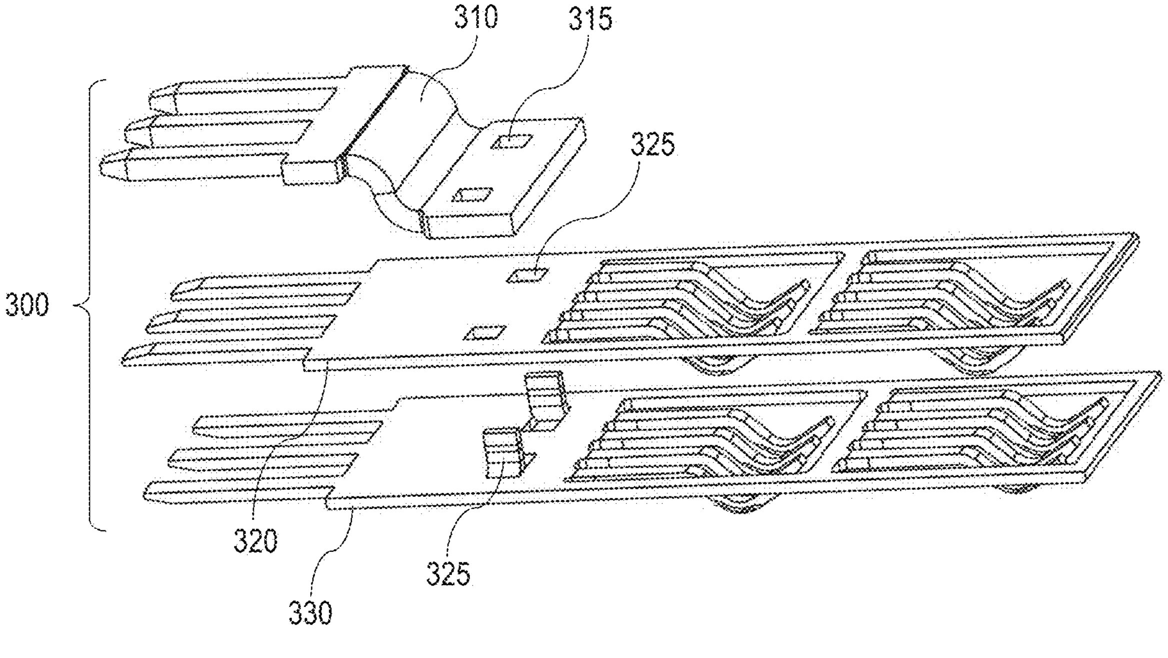

FIGS. 7A and 7B each show a perspective view of the terminal 300 in a disassembled state, according to some embodiments of the present technology. In each of FIGS. 7A and 7B. the first and second terminal layers 320, 330 and the third layer 310 are separated from each other to show similarities and differences in various parts of their structures. For example, the third layer 310 may be devoid of fingers. In some embodiments, the first terminal layer 320 may be considered a "sandwiched" layer due to the first terminal layer 320 being disposed between the second terminal layer 330 and the third layer 310, as depicted in FIGS. 5 and 7B. In some embodiments, the second terminal layer 330 may be considered an "inner" terminal layer due to the second terminal layer 330 being disposed closer to the card-insertion opening 104 than the first terminal layer 320 and the third layer 310, as depicted in FIG. 5. In some embodiments, the third layer 310 may be considered an "outer" terminal layer due to the third layer 310 being disposed farther away from the card-insertion opening 104 than the first and second terminal layers 320, 330.

Although the third layer 310 is depicted in FIGS. 7A and 7B to be devoid of fingers, in some embodiments of the present technology the third layer may be a terminal layer and may comprise one or more third fingers (not shown).

Figure 8A:
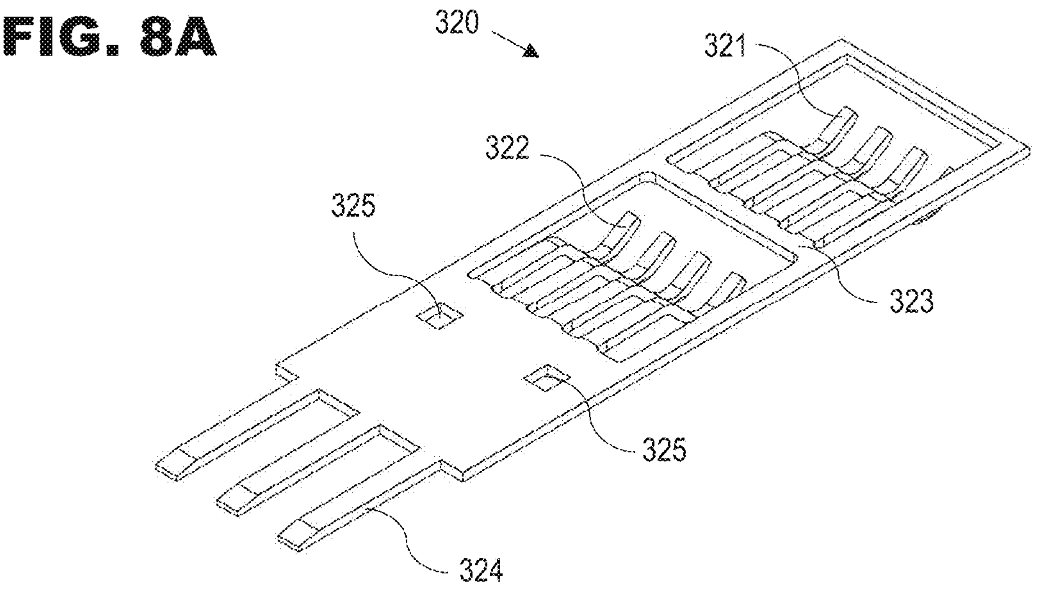
Figure 8B:
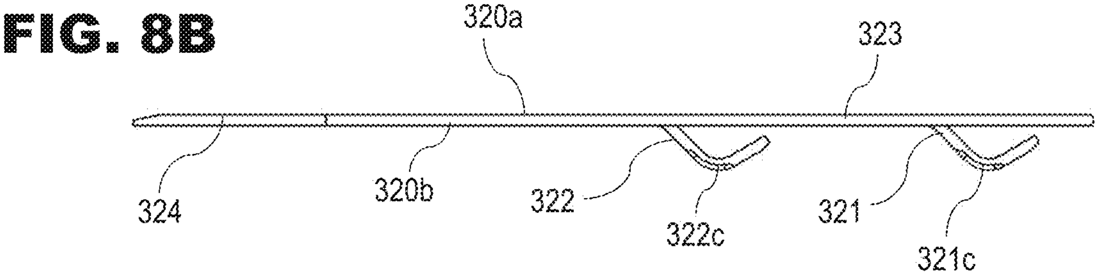
Figure 8C:
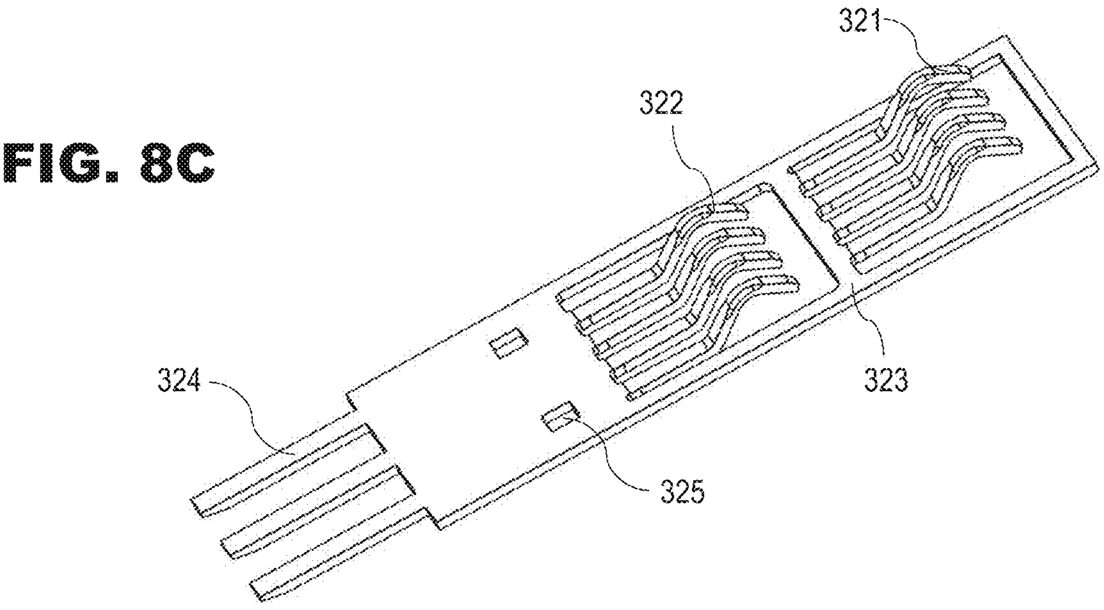
Figure 8D:
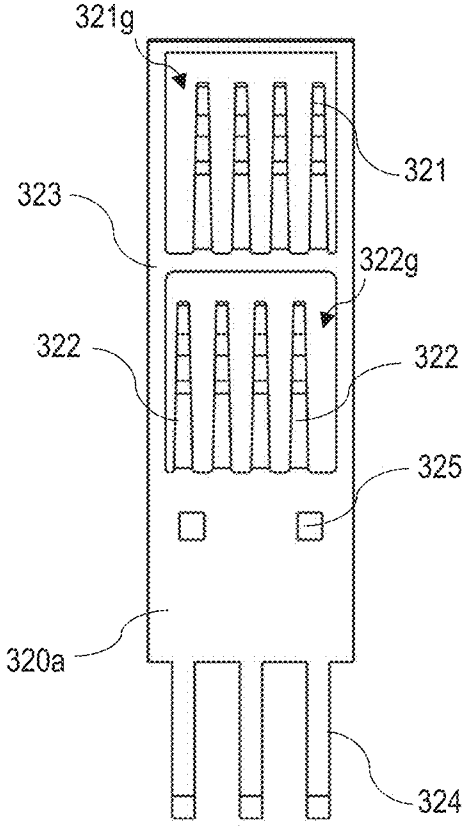
Figure 8E:
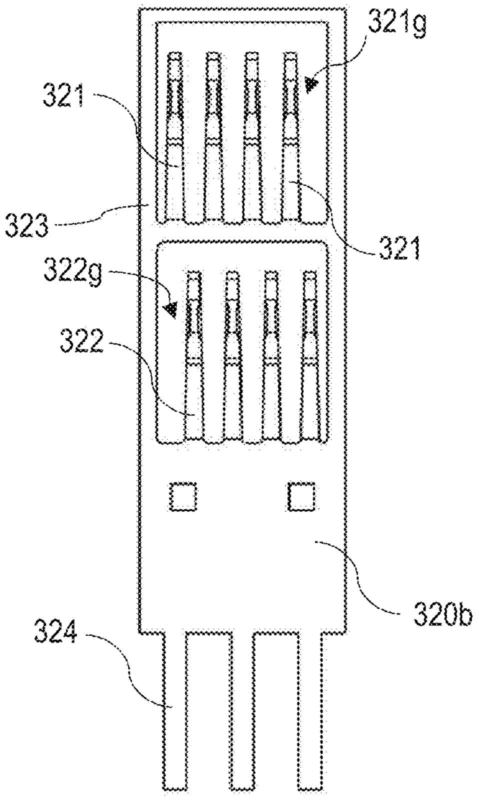
Figure 8F:
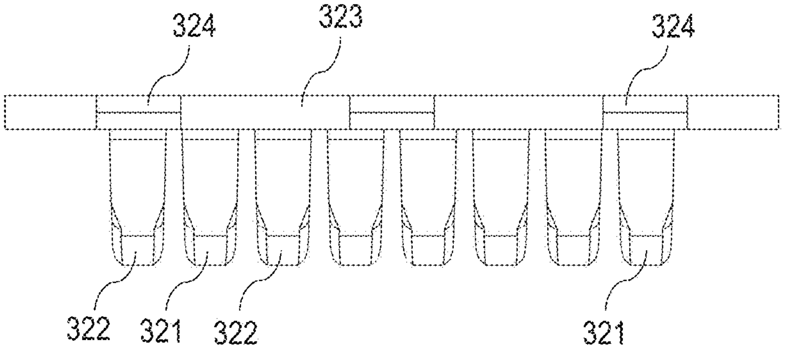
Figure 8G:
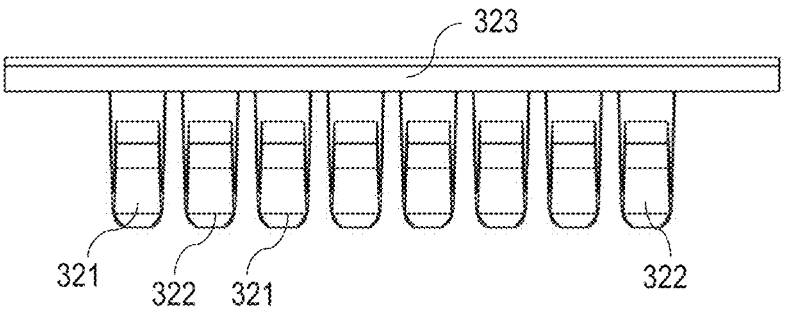

FIGS. 8A through 8G show views of the first terminal layer 320, according to some embodiments of the present technology, of which FIG. 8A is a tail-end perspective view showing a first side 320*a* that faces an internal side 310*b* of the third layer 310, FIG. 8B is a plan view of a right side, FIG. 8C is a tail-end perspective view showing a second side 320*b* that faces away from the first side 320*a*, FIG. 8D is a plan view of the first side 320*a*, FIG. 8E is a plan view of the second side 320*b*, FIG. 8F is a plan view of a bottom (tail) side, and FIG. 8G is a plan view of a top (insertion) side. In some embodiments, the first terminal layer 320 may comprise a frame 323 configured to support a plurality of the outer-tier fingers 321 and a plurality of the inner-tier fingers 322. The frame 323 may extend generally along an X-Y plane (see FIG. 1A) of the connector 1. In some embodiments, each of the fingers 321, 322 may have an elongated portion that lies in the X-Y plane of the frame 323 and extends in the Y-direction, and a curved portion that extends outside of the X-Y plane of the frame 323 and outwards from the second side 320*b* of the first terminal layer 320, as depicted in FIG. 8B. In some embodiments, the curved portion of each of the outer-tier fingers 321 may have a convex portion that serves as a contact surface 321*c* of the outer-tier finger 321. Similarly, in some embodiments, the curved portion of each of the inner-tier fingers 322 may have a convex portion that serves as a contact surface 322*c* of the inner-tier finger 322. The contact surfaces 321*c*. 322*c* may be configured to be in contact with the card 3 when the card 3 is inserted in the card-insertion opening 104. In some embodiments, mounting pins 324 may extend from a bottom end of the frame 323 and may lie in the X-Y plane of the frame 323. As discussed below and elsewhere herein, the mounting pins 324 may each form part of a mounting tail 304 of the terminal 300.

According to some embodiments of the present technology, the outer-tier fingers 321 may have a staggered or interspersed relationship relative to the inner-tier fingers 322 such that, when the first terminal layer 320 is seen from an end view from the bottom side (FIG. 8F) or from the top side (FIG. 8G), the outer-tier fingers 321 alternate with the inner-tier fingers 322. That is, an outer-tier finger 321 is adjacent at least one inner-tier finger 322 when the first terminal layer 320 is seen from an end view. Such an arrangement may be achieved by off-setting the positions of the outer-tier fingers 321 relative to the inner-tier fingers 322 so that the outer-tier fingers 321 are not aligned with the inner-tier fingers 322 in the Y-direction. The off-setting may result in the outer-tier fingers 322 having a gap 321*g* between the last finger 321 and the frame 323 on one side of the frame 323 (e.g., the left side), and the inner-tier fingers 322 having a gap 322*g* between the last finger 322 and the frame 323 on the other side of the frame 323 (e.g., on the right side), as depicted in FIGS. 8D and 8E.

Figure 9A:
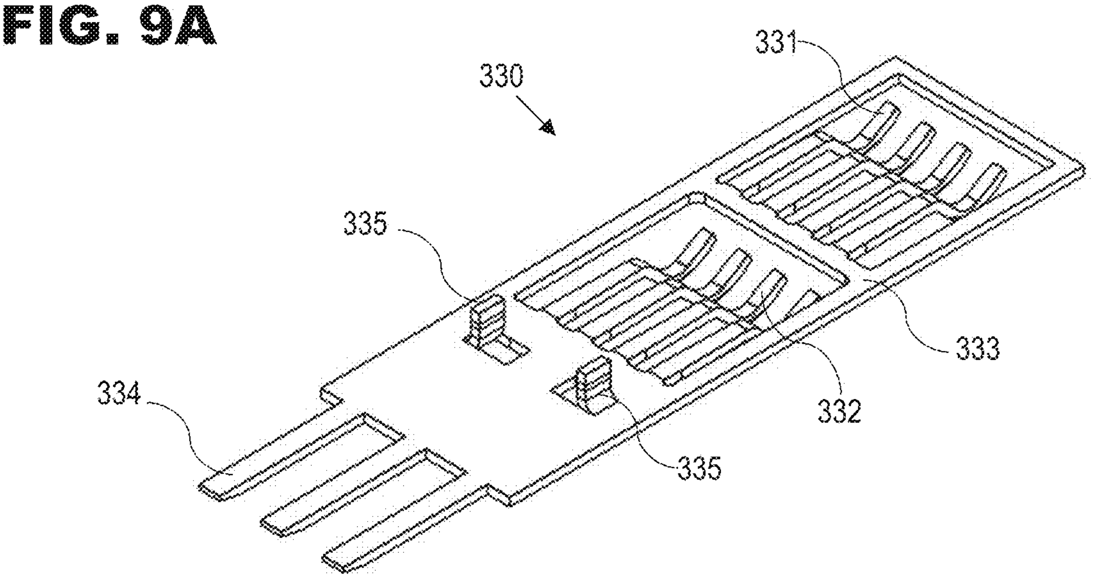
Figure 9B:
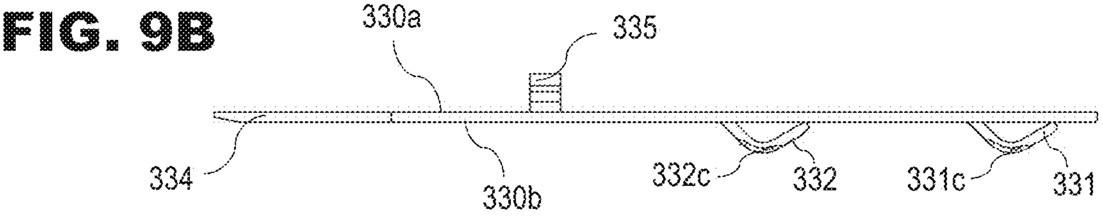
Figure 9C:
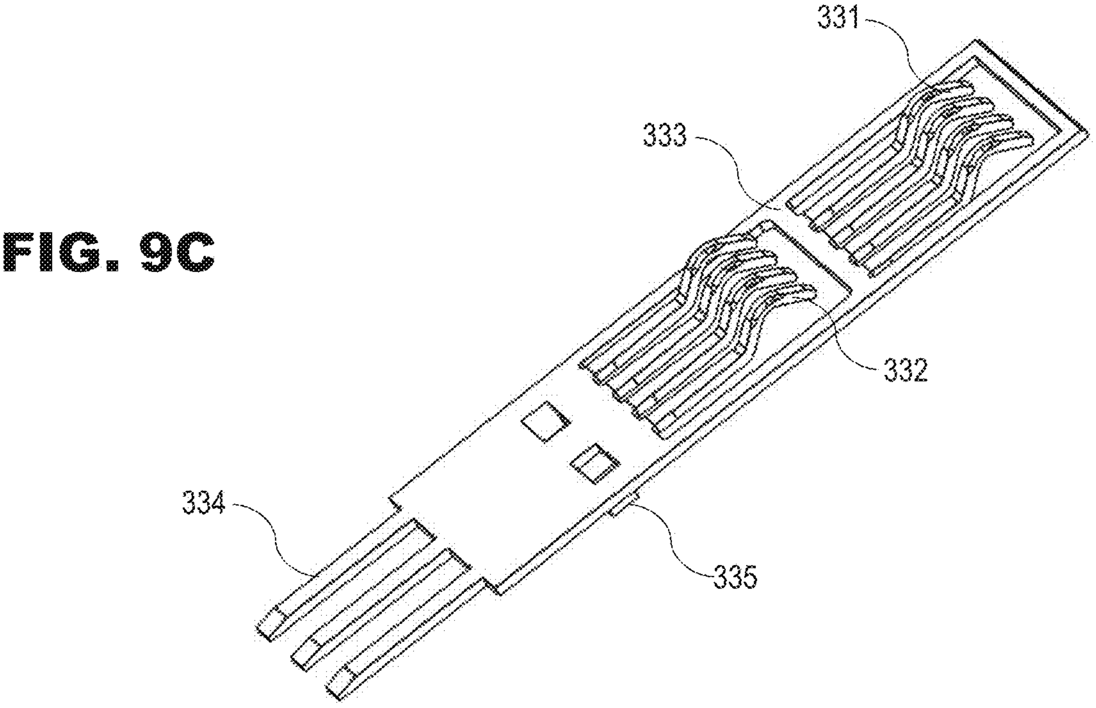
Figure 9D:
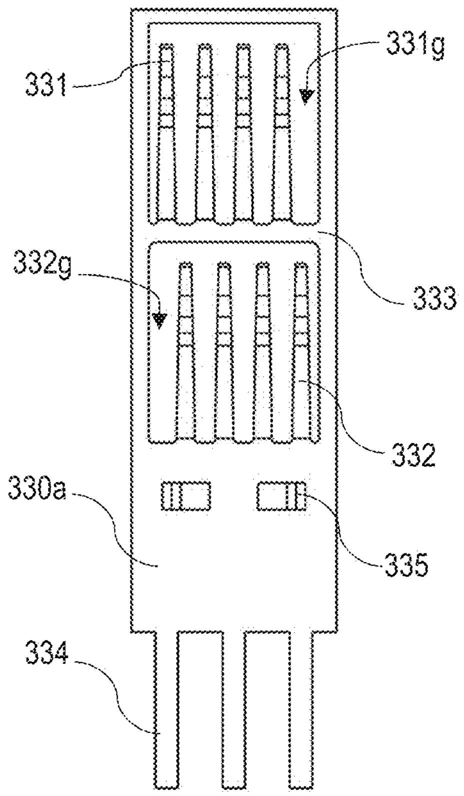
Figure 9E:
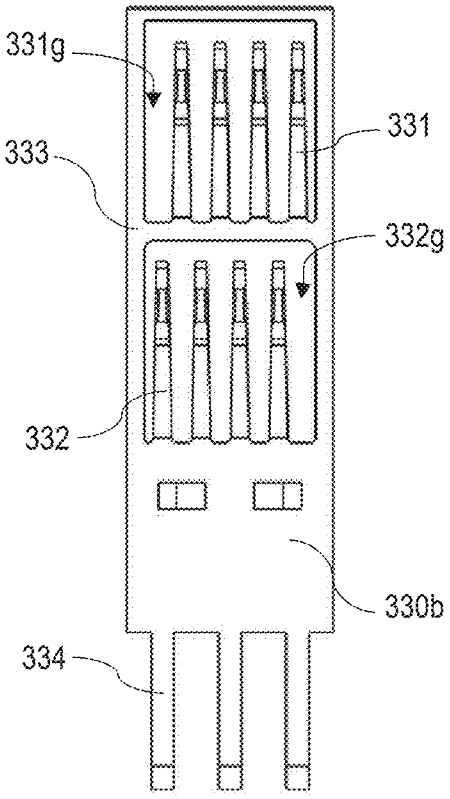
Figure 9F:
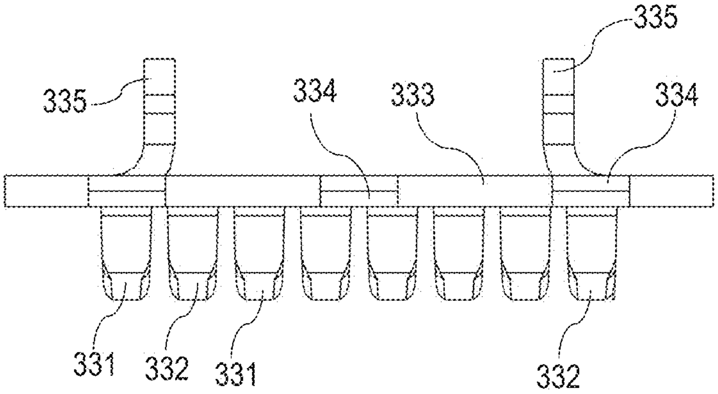
Figure 9G:
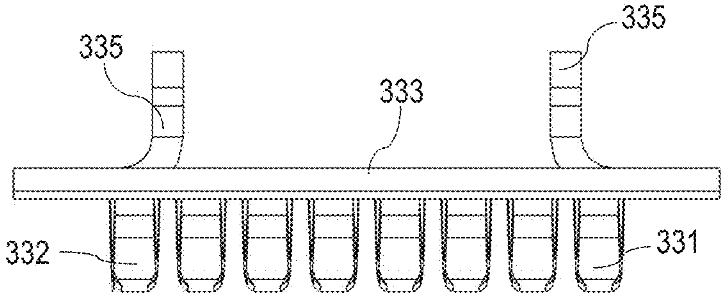

FIGS. 9A through 9G show views of the second terminal layer 330, according to some embodiments of the present technology, of which FIG. 9A is a tail-end perspective view showing a first side 330*a* that faces the second side 320*b* of the first terminal layer 320, FIG. 9B is a plan view of a right side, FIG. 9C is a tail-end perspective view of a second side 330*b* that faces away from the first side 330*a*, FIG. 9D is a plan view of the first side 330*a*, FIG. 9E is a plan view of the second side 330*b*, FIG. 9F is a plan view of a bottom (tail) side, and FIG. 9G is a plan view of a top (insertion) side. In some embodiments, the second terminal layer 330 may comprise a frame 333 configured to support a plurality of the outer-tier fingers 331 and a plurality of the inner-tier fingers 332. The frame 333 may extend generally along an X-Y plane (see FIG. 1A) of the connector 1. In some embodiments, each of the fingers 331, 332 may have an elongated portion that lies in the X-Y plane of the frame 333 and extends in the Y-direction, and a curved portion that extends outside of the X-Y plane of the frame 333 and outwards from the second side 330*b* of the second terminal layer 330, as depicted in FIG. 9B. In some embodiments, the curved portion of each of the outer-tier fingers 331 may have a convex portion that serves as a contact surface 331*c* of the outer-tier finger 331. Similarly, in some embodiments, the curved portion of each of the inner-tier fingers 332 may have a convex portion that serves as a contact surface 332*c* of the inner-tier finger 332. The contact surfaces 331*c*. 332*c* may be configured to be in contact with the card 3 when the card 3 is inserted in the card-insertion opening 104. In some embodiments, mounting pins 334 may extend from a bottom end of the frame 333 and may lie in the X-Y plane of the frame 333. When the first terminal layer 320 and the second terminal layer 330 are assembled together to form the terminal 300, the mounting pins 324 of the first terminal layer 320 may combine with the mounting pins 334 of the second terminal layer 330, respectively, to form mounting tails 304 of the terminal 300. Thus, in some embodiments, a terminal-tail hole 2*b* of the substrate 2 may receive a mounting pin 324 of the first terminal layer 320 and a mounting pin 330 of the second terminal layer 330 in the same hole 2*b*.

According to some embodiments of the present technology, the outer-tier fingers 331 may have a staggered or interspersed relationship relative to the inner-tier fingers 332 such that, when the second terminal layer 330 is seen from an end view from the bottom side (FIG. 9F) or from the top side (FIG. 9G), the outer-tier fingers 331 alternate with the inner-tier fingers 332, similar to the fingers of the first terminal layer 320. Such an arrangement may be achieved by off-setting the positions of the outer-tier fingers 331 relative to the inner-tier fingers 332 so that the outer-tier fingers 331 are not aligned with the inner-tier fingers 332 in the Y-direction. The off-setting may result in the outer-tier fingers 332 having a gap 331*g* between the last finger 331 and the frame 333 on one side of the frame 333 (e.g., the right side), and the inner-tier fingers 332 having a gap 332*g* between the last finger 332 and the frame 333 on the other side of the frame 323 (e.g., on the left side), as depicted in FIGS. 9D and 9E.

According to some embodiments of the present technology, when the first terminal layer 320 and the second terminal layer 330 are assembled together to form the terminal 300, the outer-tier fingers 321 of the first terminal layer 320 may alternate with the outer-tier fingers 331 of the second terminal layer 330 such that the fingers 321, 331 are staggered or interspersed, as depicted in FIG. 7A. Similarly, when the first terminal layer 320 and the second terminal layer 330 are assembled together to form the terminal 300, the inner-tier fingers 322 of the first terminal layer 320 may alternate with the inner-tier fingers 332 of the second terminal layer 330 such that the fingers 322, 332 are staggered or interspersed, as depicted in FIG. 7A. As will be appreciated, because the frame 323 of the first terminal layer 320 is relatively farther away from the card-insertion opening 104 than the frame 333 of the second terminal layer 330, a distance of the contact surfaces 321*c*. 322*c* from the second surface 320*b* of the first terminal layer 320 may be greater than a distance of the contact surfaces 331*c*. 332*c* from the second surface 330*b* of the second terminal layer 330, such that the all the contact surfaces 321*c*, 322*c*, 331*c*, 332*c* of the terminal 300 may simultaneously contact the card 3 when then card is inserted in the card-insertion opening 104 of the connector 1. In some embodiments, all the contact surfaces 321*c*, 322*c*, 331*c*, 332*c* may be coplanar. In some embodiments, the contact surfaces 321*c*, 331*c* of the outer-tier fingers 321, 331 may be colinear (i.e., aligned along a common outer line). In some embodiments, the contact surfaces 322*c*, 332*c* of the inner-tier fingers 322, 332 may be colinear (i.e., aligned along a common inner line). In some embodiments, the contact surfaces 321*c* of the outer-tier fingers 321 of the first terminal layer 320 may be aligned along a first line, the contact surfaces 331*c* of the outer-tier fingers 331 of the second terminal layer 330 may be aligned along a second line, the contact surfaces 322*c* of the inner-tier fingers 322 of the first terminal layer 320 may be aligned along a third line, the contact surfaces 332*c* of the inner-tier fingers 332 of the second terminal layer 330 may be aligned along a fourth line, with the first and second lines being different from each other and/or with the third and fourth lines being different from each other.

According to some embodiments of the present technology, the terminal 300 may comprise at least eight outer-tier fingers 321, 331 and at least eight inner-tier fingers 322, 332 and therefore may provide at least sixteen contact surfaces 321*c*. 331*c*, 322*c*. 332*c*. In some embodiments, the terminal 300 may have more than eight fingers per layer, and/or more than two tiers of fingers per layer, and/or more than two terminal layers of fingers. In some embodiments, the terminal 300 may have twenty to forty contact surfaces provided in two to three tiers of two to three terminal layers.

According to some embodiments, the first terminal layer 320 may comprise a plurality of alignment portions 325 configured to engage with a plurality of alignment portions 335 of the second terminal layer 330, such that when the alignment portions 325, 335 are engaged with each other the first and second terminal portions are in a fixed position relative to each other. In some embodiments, the alignment portions 325 may be alignment holes in the frame 323 of the first terminal layer 320, and the alignment portions 335 may be alignment protrusions extending from the first surface 330*a* of the second terminal layer 330 and configured to be received in the alignment holes of the first terminal layer 320.

Figure 10A:
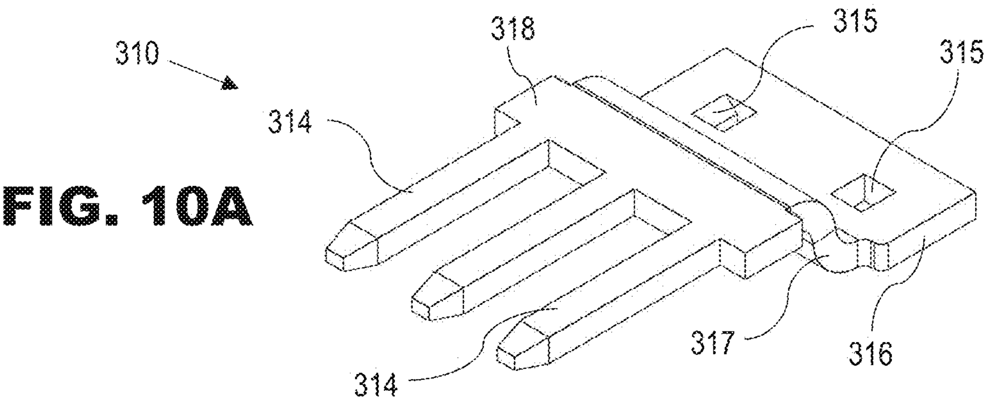
Figure 10B:
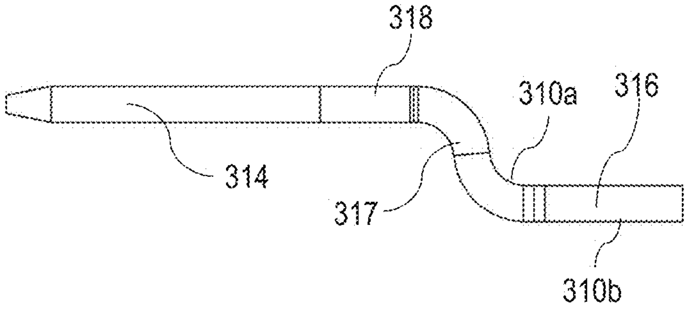
Figure 10C:
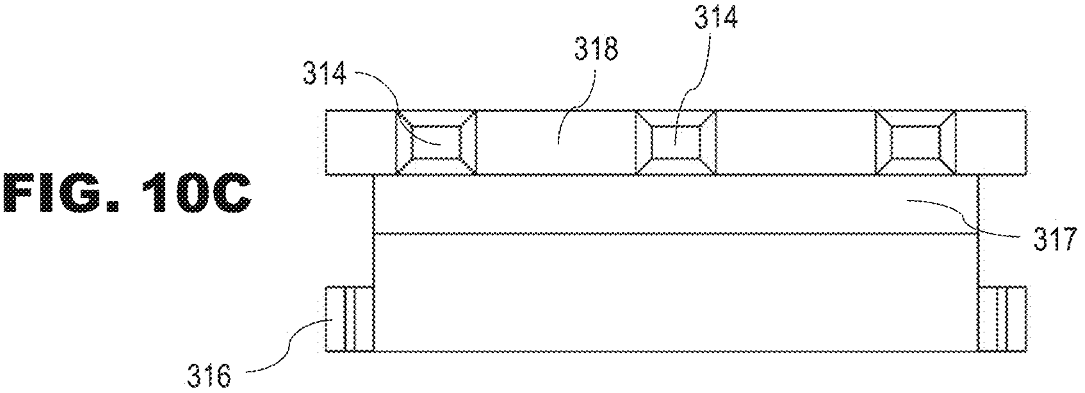
Figure 10D:
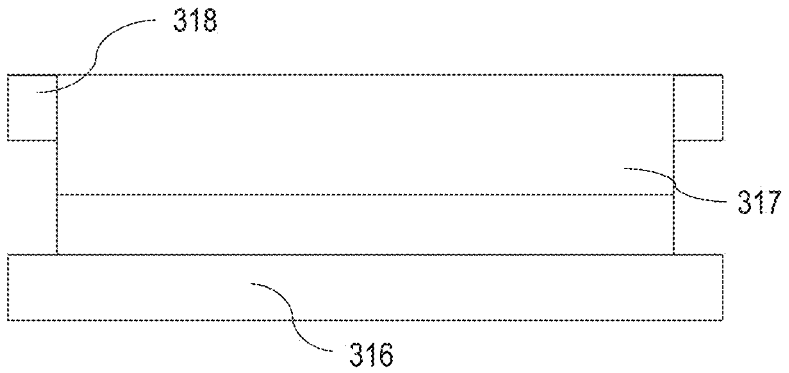

FIGS. 10A through 10D show views of the third layer 310, according to some embodiments of the present technology, of which FIG. 10A is a tail-end perspective view of an external side 310*a*, FIG. 10B is a plan view of a right side, FIG. 10C is a plan view of a bottom (tail) side, and FIG. 10D is a plan view of a top (insertion) side. In some embodiments, the third layer 310 may provide support for the terminal 300 but may not include any finger configured to contact the card 3 when the card is inserted in the card-insertion opening 104 of the connector 1. As noted above, the third layer 310 may be an outer terminal layer disposed farther away from the card-insertion opening 104 than the first and second terminal layers 320, 330. In some embodiments, the third layer 310 may comprise an internal surface 310*b* facing the first terminal layer 320. An external surface 310*a* of the third layer 310 may face a surface of the housing 100, as depicted in FIGS. 5 and 6. In some embodiments, the third layer 310 may comprise a base portion 316 extending in a first X-Y plane, a pin bar 318 and a plurality of mounting pins 314 extending in a second X-Y plane different from the first X-Y plane, and a sloped portion 317 connecting the base portion 316 with the pin bar 318, as shown in FIGS. 10A and 10B. The base portion 316 may comprise a plurality of alignment portions 315 configured to align the third layer 310 with the first terminal layer 320 and/or the second terminal layer 330. For example, the alignment portions 315 may be alignment holes, the alignment portions 325 of the first terminal layer 320 may be alignment holes, and the alignment portions 335 of the second terminal layer may be protrusions configured to extend into the alignment holes of the first terminal layer 320 and the third layer 310, such that the positions of the first and second terminal layers 320, 330 and the third layer 310 are fixed relative to each other.

As noted above, the third layer 310 may be a third terminal layer. In some embodiments of the present technology, the third terminal layer 310 may comprise at least one finger (not shown) extending from the base portion 316, such that an elongated portion of the at least one finger is attached at one end to the base portion 316 and is free at an opposite end. The at least one finger of the third terminal layer 310 may otherwise be similar in structure to the fingers 321, 331, 322, 332 of the first and second terminal layers 320, 330. For example, the free end of the at least one finger of the third terminal layer 310 may comprise a convex portion configured to contact a card, or a bus bar, or the like.

According to some embodiments of the present technology, the mounting pins 314 may comprise some of the mounting tails 304 of the terminal 300. That is, each mounting pin 314 may be configured to be received in its own terminal-tail hole 2*b* of the substrate 2. In some embodiments, the third layer 310 may serve to provide support and structuring sturdiness to the terminal 300 when the terminal 300 is mounted on the substrate 2. For example, because the terminal 300 includes multiple rows of mounting tails 304, some of which extend from the third layer 310 and some of which are comprised of mounting pins 324, 334 of the first and second terminal layers 320, 330, the terminal 300 may be less prone to mechanical distorting (e.g., twisting caused by a shear force) in which the first terminal layer 320 may be displaced relative to the second terminal layer 330, because the third layer 310 may clamp the first terminal layer 320 to the second terminal layer 330.

Figure 12C:
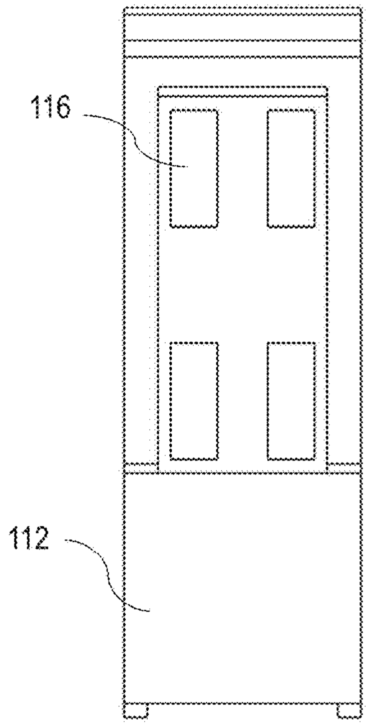
Figure 12A:
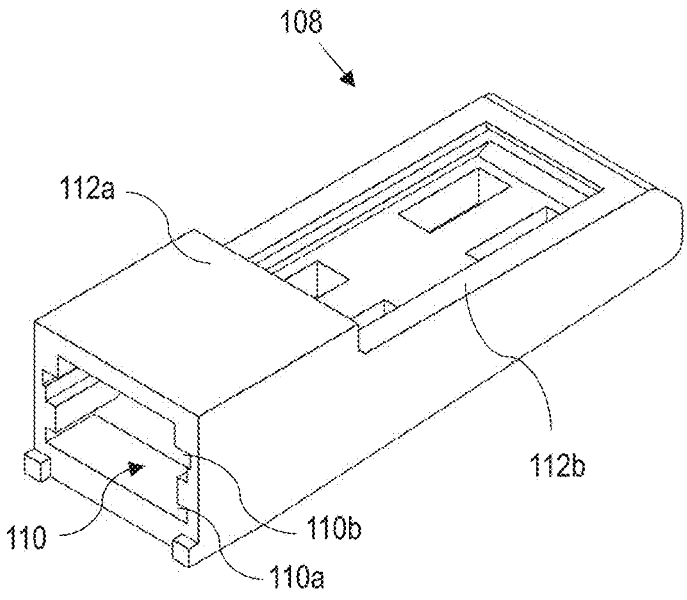
Figure 12B:
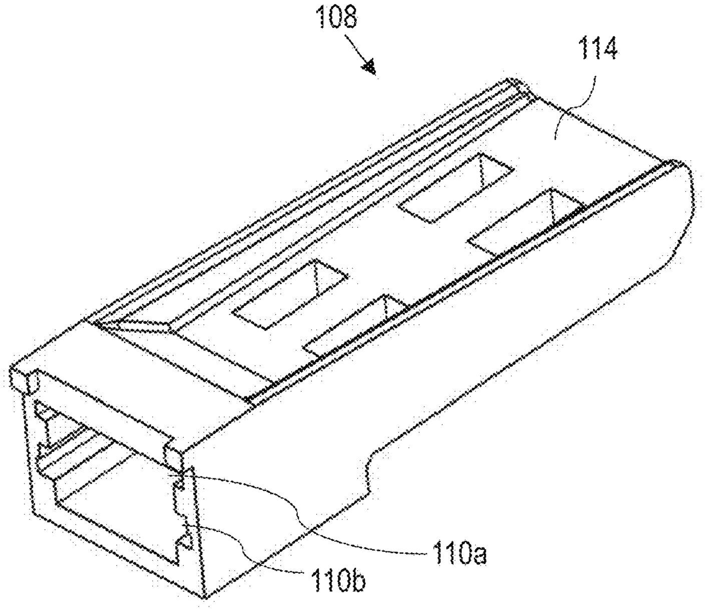
Figure 12D:
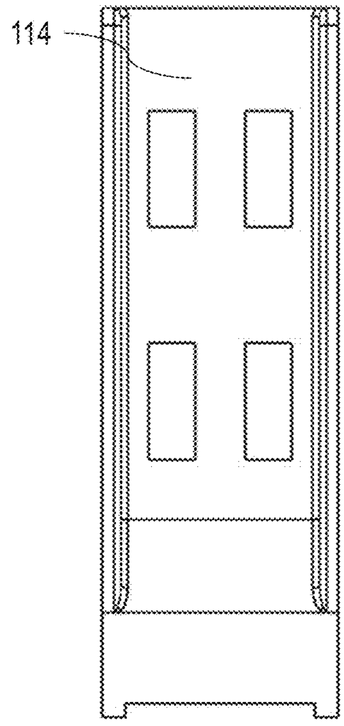
Figure 12E:
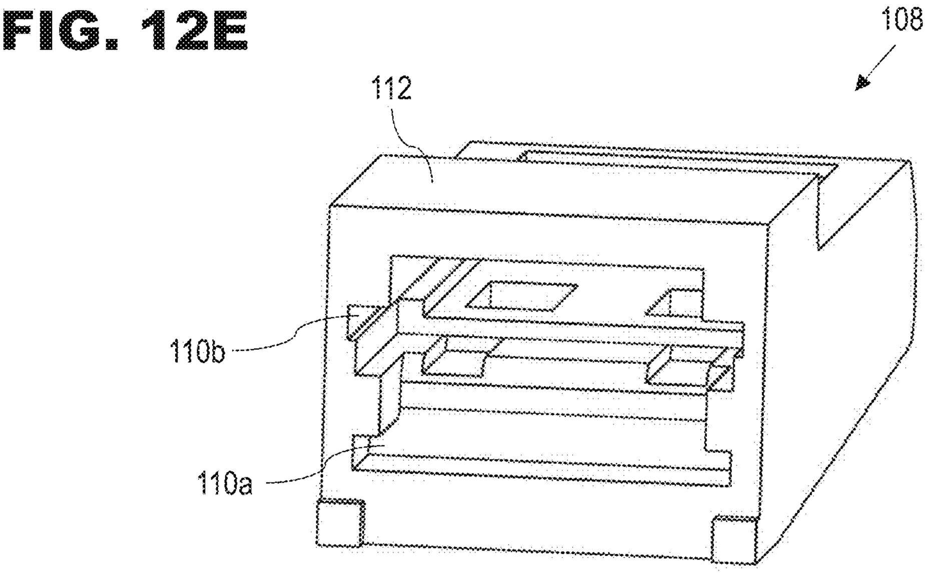
Figure 12F:
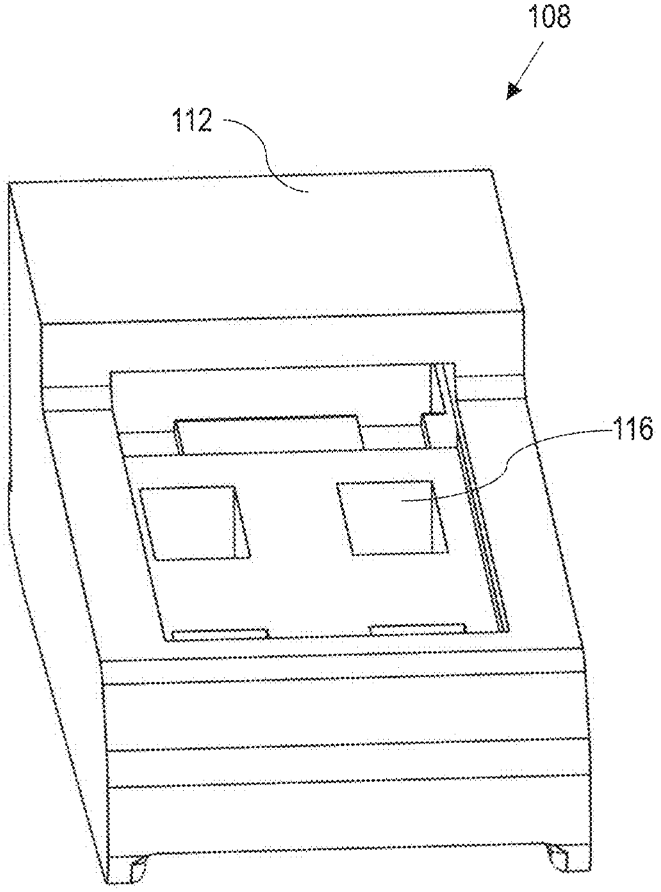
Figure 13A:
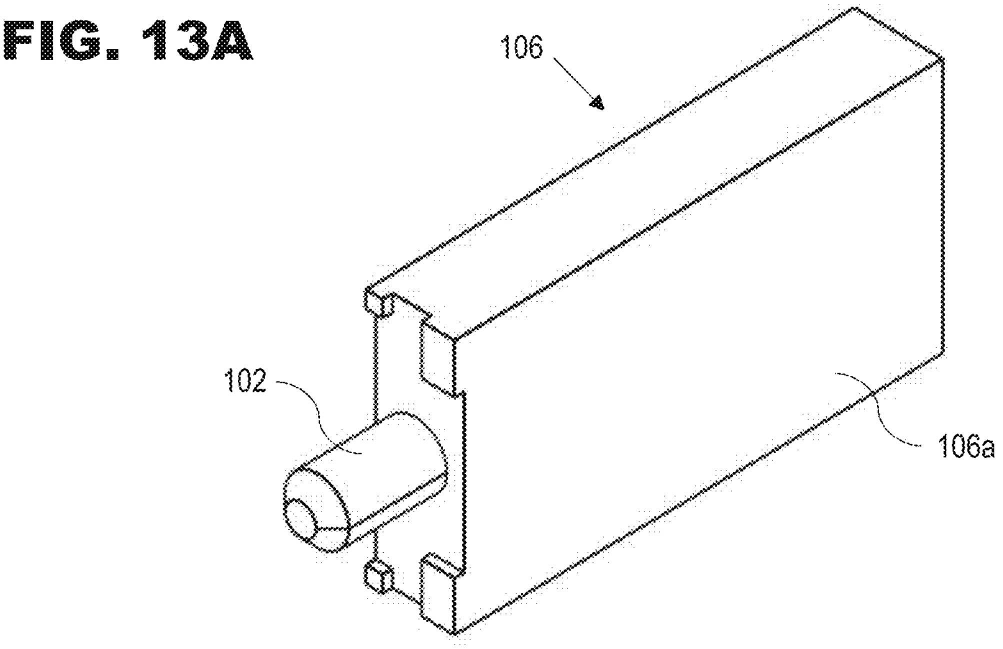
FIGS. 13A and 13B show perspective views of a bottom side and a top side, respectively, of an end portion of the housing of FIG. 5, according to some embodiments of the present technology.
Figure 13B:
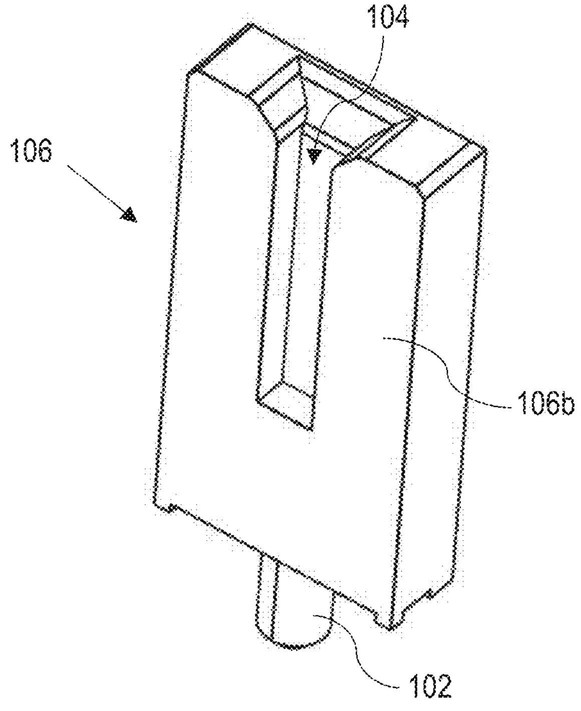

Turning now to the housing 100, as noted above, the housing 100 may comprise a plurality of terminal compartments 108 (108A, 108B) located between two end portions 106, as depicted in FIGS. 2B and 2C. FIG. 11A through 11D show views of a pair 150 of the terminal compartments 108A, 108B of the housing 100, according to some embodiments of the present technology, of which FIG. 11A is a perspective view of a bottom side, FIG. 11B is a plan view of the bottom side, FIG. 11C is a plan view of a top side, and FIG. 11D is a plan view of a right side or a left side. The terminal compartments 108A, 108B of the pair 150 may be mirror images of each other and therefore may be described individually as the terminal compartment 108 shown in FIGS. 12A through 12F, of which FIG. 12A is a perspective view of the bottom side showing an internal side, FIG. 12B is a perspective of the bottom side showing an external side, FIG. 12C is a plan view of the internal side, FIG. 12D is a plan view of the external side, FIG. 12E is a perspective view of the bottom side showing a bottom portion of an internal structure, and FIG. 12F is a perspective view of the top side showing a top portion of the internal structure. FIGS. 13A and 13B show perspective views of a bottom side and a top side, respectively, of the end portion 106 of the housing 100, according to some embodiments of the present technology.

According to some embodiments of the present technology, The terminal compartments 108 (108A, 108B) may comprise a terminal-tail opening 110 (110A, 110B) at the bottom side, through which the terminal 300 may be inserted during manufacturing of the connector 1. FIG. 6 shows an example of a pair of terminals 300A, 300B being inserted in a pair of terminal compartments 108A, 108Ba, according to some embodiments. Top portions of the frames 323, 333 may be inserted into the openings 110A, 110B first, followed by the outer-tier fingers 321, 331 and then the inner-tier fingers 322, 332, by exerting a force in the direction of the arrows in FIG. 6. In some embodiments, when the terminals 300A, 300B are fully lodged in their respective terminal compartments 108A, 108B, the mounting tails 304 may be located outside of the terminal compartments 108A, 108B, as depicted in FIGS. 1B and 2C. When the terminal compartments 108A, 108B are joined together in the connector 1, a space or slot between the terminal compartments 108A, 108B may form part of the card-insertion opening 104, as depicted in FIG. 11D. Each terminal compartment 108 may comprise an external surface 114, a raised internal surface 112*a* and a sunken internal surface 112*b*. In some embodiments, when two terminal compartments 108 are joined together to form the pair 150, the raised internal surfaces 112*a* may face each other and may directly contact each other while the sunken internal surfaces 112*b* may face each other but may be separated from each other, with the separation serving as part of the card-insertion opening 104. The terminal compartment 108 may be provided with a plurality of holes 116, which may be through-holes that extend from the external surface 114 and may expose portions of the fingers 321, 322, 331, 332 to an external environment of the connector 1. In some embodiments, the holes 116 may serve as vent holes and may be located near the contact surfaces 321*c*, 322*c*, 331*c*, 332*c* to facilitate movement of heat away from the contact surfaces 321*c*, 322*c*, 331*c*, 332*c* during high-power transmissions.

According to some embodiments of the present technology, each terminal compartment 108 may comprise an outer opening portion 110*a* and an inner opening portion 110*b*. The outer opening portion 110*a* may comprise left and right grooves having ledges that form an outer slot configured to accommodate left and right edge portions of the base portion 316 of the third layer 310 of the terminal 300. The inner opening portion 110*b* may comprise left and right grooves having ledges that form an inner slot configured to accommodate left and right edge portions of the frames 323, 333 of the first and second terminal layers 320, 330. In some embodiments, the left and right grooves of the inner opening portions 110*b* may extend into an interior region of the terminal compartment 108 and may be configured to accommodate some or all of the left and right edges of the frames 323, 333 as well as top edges of the frames 323, 333. The left and right grooves of the inner opening portion 110*b* may serve to hold the frames 323, 333 against each other in the terminal compartment 108. In some embodiments, the first and second terminal layers 320, 330 may be held together at a fixed position relative to each other and relative to the terminal compartment 108 by the alignment portions 325, 335 and by confinement of the edges of the frames 323, 333 in the left and right grooves of the inner opening portion 110*b*. In some embodiments, the terminal 300 may be assembled and incorporated in the terminal compartment 108 without the use of a fastener (e.g., glue, plastic molding, metal clip, insulative clip, etc.) to hold the layers 310, 320, 330 together. It should be appreciated that even though a fastener need not be used, some embodiments of the present technology may use a fastener to hold the layers 310, 320, 330 together.

As discussed above, the end portions 106 of the housing 100 may join an end of Row A of the connector segments 1A and an end of Row B of connector segments 1B, according to some embodiments of the present technology. An external side 106*a* of each of the end portions 106 may be an external side of the connector 1. An internal side 106*a* of each of the end portions 106 may comprise an end of the card-insertion opening 104, as shown in FIG. 13B. An anchor peg 102 may extend from each of the end portions 106 and may be configured to be received in corresponding anchor-peg holes 2*a* in the substrate 2, as depicted in FIG. 1B.

Variations to the embodiments described herein may be made without departing from the scope of the disclosed techniques. For example, although Row A of the connector 1 may be described to be a mirror image of Row B, it should be understood that the present technology does not require Row A and Row B to be mirror images of each other. In some embodiments. the connector segments 1A may be visibly different from the connector segments 1B to enable a user to discern a front side from a back side. In another example, although the alignment portions 335 may be described to be protrusions while the alignment portions 315, 325 may be described to be holes, it should be understood that the alignment portions 335 may be holes while the alignment portions 315 or the alignment portions 325 may be protrusions.

KEY TO REFERENCE NUMERALS

1 card-edge connector
1A connector segment (Row A)
1B connector segment (Row B)
1P pair of connector segments
2 substrate board
2*a* hole for anchor peg
2*b* hole for terminal tail
3 mating component, such as an insertable card (e.g., PCB)
3*a* contact region
10 assembly of 1, 2, and 3
100 insulative housing
102 anchor peg
104 card-insertion slot
106 end portion
106*a* external side
106*b* internal side
108 terminal compartment
108A terminal compartment (Row A)
108B terminal compartment (Row B)
110 terminal tail opening
110A terminal tail opening (Row A)
110B terminal tail opening (Row B)
110*a* outer groove
110*b* inner groove
112*a* internal surface (interface)
112*b* internal surface (sunken)
114 external side
116 vent hole
150 pair of terminal compartments (108A+108B)
300 terminal
304 mounting tail (314, 324+334)
300A terminal (Row A)
300B terminal (Row B)
310 third layer (outer portion/support portion)

310*a* external side
310*b* internal side
310A outer portion of 300A
310B outer portion of 300B
314 mounting pin
315 alignment hole
316 base portion
317 sloped portion
318 pin bar
320 first terminal layer of 300
320*a* first side (faces 310*b*)
320*b* second side
320A sandwiched terminal portion of 300A
320B sandwiched terminal portion of 300B
321 outer-tier finger of 320
321*c* contact surface
321*g* outer-tier gap
321A outer-tier finger of 320A
321B outer-tier finger of 320B
322 inner-tier finger of 320
322*c* contact surface
322*g* inner-tier gap
322A inner-tier finger of 320A
322B inner-tier finger of 320B
323 frame
324 projection (portion of mounting pin/tail)
325 alignment hole of 330
330 inner terminal portion of 300
330*a* first side (faces 320*b*)
330*b* second side
330A inner terminal portion of 300A
330B inner terminal portion of 300B
331 outer-tier finger of 330
331*c* contact surface
331*g* outer-tier gap
331A outer-tier finger of 330A
331B outer-tier finger of 330B
332 inner-tier finger of 330
332*c* contact surface
322*g* inner-tier gap
332A inner-tier finger of 330A
332B inner-tier finger of 330B
333 frame
334 projection (portion of mounting pin/tail)
335 alignment protrusion of 330
350 pair of terminals (300A+300B)
IT inner tier
IT-A inner tier of Row A
IT-B inner tier of Row B
OT outer tier
OT-A outer tier of Row A
OT-B outer tier of Row B

CONCLUSION

The foregoing features may be used, separately or together in any combination, in any of the embodiments discussed herein.

Further, although advantages of the present technology disclosed herein may be indicated, it should be appreciated that not every embodiment of the disclosed technology will include every described advantage. Some embodiments may not implement any features described as advantageous herein. Accordingly, the foregoing description and attached drawings are by way of example only.

Variations of the disclosed embodiments are possible and are within the scope of the present disclosure.

Various aspects of the present technology disclosed herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the description and the claims to modify an element does not by itself connote any priority, precedence, or order of one element over another, or the temporal order in which acts of a method are performed, but are used merely as labels to distinguish one element or act having a certain name from another element or act having a same name (but for use of the ordinal term) to distinguish the elements or acts.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

As used herein in the specification and in the claims, the phrase "equal" or "the same" in reference to two values (e.g., distances, widths, etc.) means that two values are the same within manufacturing tolerances. Thus, two values being equal, or the same, may mean that the two values are different from one another by +5%.

The phrase "and/or." as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of." or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either." "one of." "only one of." or "exactly one of." "Consisting essentially of," when used in the claims, shall have its ordinary meaning as used in the field of patent law.

Also, the phraseology and terminology used herein is for the purpose of description and should not be regarded as limiting. Use of terms such as "including," "comprising," "comprised of," "having," "containing," and "involving," and variations thereof herein, is meant to encompass the items listed thereafter and equivalents thereof as well as additional items.

The terms "approximately" and "about" if used herein may be construed to mean within +20% of a target value in some embodiments, within +10% of a target value in some embodiments, within +5% of a target value in some embodiments, and within +2% of a target value in some embodiments. The terms "approximately" and "about" may equal the target value.

The term "substantially" if used herein may be construed to mean within 95% of a target value in some embodiments, within 98% of a target value in some embodiments, within 99% of a target value in some embodiments, and within 99.5% of a target value in some embodiments. In some embodiments, the term "substantially" may equal 100% of the target value.

What is claimed is:

1. An electrical connector, comprising:

an insulative housing comprising a slot configured to receive a removable mating component; and a plurality of conductive terminal assemblies comprising a plurality of contact surfaces and disposed in the housing such that the contact surfaces are exposed in the slot, each conductive terminal assembly comprising a plurality of conductive terminal layers, wherein:

each of the conductive terminal layers comprises a plurality of fingers disposed in a plurality of tiers including an outer tier and an inner tier, with contact points of the contact surfaces being disposed on the fingers, the fingers including at least outer fingers disposed in the outer tier and inner fingers disposed in the inner tier, the outer tier and the inner tier being parallel to a row direction, the outer fingers of the outer tier are interspersed such that an outer finger of a first conductive terminal layer is adjacent an outer finger of a second conductive terminal layer of the plurality of conductive terminal layers, the inner fingers of the inner tiers of the plurality of conductive terminal layers are interspersed such that an inner finger of the first conductive terminal layer is adjacent an inner finger of the second conductive terminal layer of the plurality of conductive terminal layers, first outer contact surfaces of the outer fingers of the outer tier of the first conductive terminal layer are aligned in at least a first row parallel to the row direction, second outer contact surfaces of the outer fingers of the second conductive terminal layer are aligned in at least a second row parallel to the row direction, first inner contact surfaces of the inner fingers of the inner tier of the first conductive terminal layer are aligned in at least a third row parallel to the row direction, and second inner contact surfaces of the inner fingers of the second conductive terminal layer are aligned in at least a fourth row parallel to the row direction.

2. The connector of claim 1, wherein the outer fingers and the inner fingers are arranged in columns, each column extending parallel to a column direction and perpendicular to the row direction, and each column comprising a finger of the first conductive terminal layer and a finger of the second conductive terminal layer.

3. The connector of claim 1, wherein:

each conductive terminal assembly comprises a conductive outer member positioned adjacent a first surface of the first conductive terminal layer, and the second conductive terminal layer comprises a second conductive terminal layer positioned adjacent a second surface of the first conductive terminal layer.

4. The connector of claim 3, wherein, for each conductive terminal assembly, the first conductive terminal layer comprises a first frame that forms at least part of a periphery of the first conductive terminal layer, the second conductive terminal layer comprises a second frame that forms at least part of a periphery of the second conductive terminal layer, and the first and second frames are aligned with each other to form an outer frame of the conductive terminal assembly.

5. An electrical connector, comprising:

an insulative housing comprising a slot configured to receive a removable mating component;

a first row of conductive terminal assemblies comprising a plurality of contact surfaces and disposed in the housing such that the contact surfaces of the first row are exposed in the slot; and a second row of conductive terminal assemblies comprising a plurality of contact surfaces and disposed in the housing such that the contact surfaces of the second row are exposed in the slot, wherein:

the first and second rows comprise a plurality of pairs of conductive terminal assemblies, each pair of conductive terminal assemblies including a conductive terminal assembly of the first row facing a conductive terminal assembly of the second row, each conductive terminal assembly of the first and second rows comprises a plurality of fingers disposed in a plurality of tiers including an outer tier and an inner tier, with contact points of the contact surfaces of the first and second rows being disposed on the fingers, the fingers including at least outer fingers disposed in the outer tier and inner fingers disposed in the inner tier, the outer tier and the inner tier being parallel to a row direction, the contact surfaces of the outer fingers of the outer tier are aligned in at least one row parallel to the row direction, the contact surfaces of the inner fingers of the inner tier are aligned in at least one other row different from and parallel to the at least one row.

6. The connector of claim 5, wherein:

the housing comprises first and second rows of terminal compartments configured to house the first and second row of conductive terminal assemblies, respectively, the first and second rows of terminal compartments comprising a plurality of pairs of terminal compartments housing the pairs of conductive terminal assemblies, and for each pair of terminal compartments, the terminal compartment of the first row of terminal compartments is a mirror image of the terminal compartment of the second row of terminal compartments.

7. The connector of claim 5, wherein:

each conductive terminal assembly of the first and second rows comprises a plurality of conductive terminal layers, each of the conductive terminal layers comprises a portion of the outer fingers of the outer tier and a portion of the inner fingers of the inner tier, the outer fingers of the outer tier are interspersed such that an outer finger of a first conductive terminal layer is adjacent an outer finger of another one of the conductive terminal layers, and the inner fingers of the inner tier are interspersed such that an inner finger of the first conductive terminal layer is adjacent an inner finger of another one of the conductive terminal layers.

8. The connector of claim 7, wherein the outer fingers and the inner fingers are arranged in columns, each column extending parallel to a column direction and perpendicular to the row direction, and each column comprising a finger of the first conductive terminal layer and a finger of another one of the conductive terminal layers.

9. The connector of claim 5, wherein, for each conductive terminal assembly of the first and second rows, the first conductive terminal layer comprises a first frame that forms at least part of a periphery of the first conductive terminal layer, the second conductive terminal layer comprises a second frame that forms at least part of a periphery of the second conductive terminal layer, and the first and second frames are aligned with each other to form an outer frame of the conductive terminal assembly.

10. The connector of claim 9, wherein the conductive terminal layers of each conductive terminal assembly of the first and second rows are held together by grooves in the housing.

11. An electrical power terminal, comprising:

a plurality of conductive terminal layers stacked on each other, wherein:

each conductive terminal layer comprises a plurality of fingers disposed in a plurality of tiers including an outer tier and an inner tier, with contact surfaces being disposed on the fingers, the fingers including at least first fingers of a first tier and second fingers of a second tier, the first tier and the second tier being parallel to a row direction, the first fingers of the first tier are interspersed such that a first finger of a first conductive terminal layer is adjacent a first finger of a second conductive terminal layer of the plurality of conductive terminal layers, the second fingers of the second tier are interspersed such that a second finger of the first conductive terminal layer is adjacent a second finger of the second conductive terminal layer, the contact surfaces of the first fingers of the first tier of the first conductive terminal layer are aligned in at least a first row parallel to the row direction, the contact surfaces of the first fingers of the second conductive terminal layer are aligned in at least a second row parallel to the row direction, the contact surfaces of the second fingers of the second tier of the first conductive terminal layer are aligned in at least a third row parallel to the row direction, and the contact surfaces of the second fingers of the second conductive terminal layer are aligned in at least a fourth row parallel to the row direction.

12. The power terminal of claim 11, wherein the first, second, third, and fourth rows are different from each other.

13. The power terminal of claim 11, wherein:

the first row and the second row are a same row comprising an outer row, and the third row and the fourth row are a same row comprising an inner row different from the outer row.

14. The power terminal of claim 11, wherein the first fingers and the second fingers are arranged in columns, each column extending parallel to a column direction and perpendicular to the row direction, and each column comprising a finger of the first conductive terminal layer and a finger of another one of the conductive terminal layers.

15. The power terminal of claim 11, further comprising:

a conductive member positioned adjacent a first surface of the first conductive terminal layer, wherein the second conductive terminal layer is positioned adjacent a second surface of the first conductive terminal layer.

16. The power terminal of claim 15, wherein:

the first conductive terminal layer comprises a first frame that forms at least part of a periphery of the first conductive terminal layer, the second conductive terminal layer comprises a second frame that forms at least part of a periphery of the second conductive terminal layer, and the first and second frames are aligned with each other to form an outer frame of the power terminal.

17. The power terminal of claim 16, wherein:

the first frame comprises a plurality of first alignment parts, and the second frame comprises a plurality of second alignment parts configured to engage with the first alignment parts such that the first and second conductive terminal layers are at a fixed position relative to each other.

18. The power terminal of claim 17, wherein the member comprises a plurality of alignment parts configured to engage with the first alignment parts and/or the second alignment parts such that the member is at a fixed position relative to the first conductive terminal layer and/or the second conductive terminal layer.

19. The power terminal of claim 16, wherein:

each of the first fingers of the first conductive terminal layer comprises:

a first elongated portion attached to and coplanar with the first frame, and a first free end extending from the first elongated portion, the first free end being curved and having a convex side bearing one of the contact surfaces of the first fingers, and each of the second fingers of the second conductive terminal layer comprises:

a second elongated portion attached to and coplanar with the second frame, and a second free end extending from the second elongated portion, the second free end being curved and having a convex side bearing one of the contact surfaces of the second fingers.

20. The power terminal of claim 19, wherein:

the member comprises a third conductive terminal layer of the other conductive terminal layers, the member comprises at least one third finger having a contact surface, and the at least one third finger comprises:

a third elongated portion attached to and coplanar with the base portion, and a third free end extending from the third elongated portion, the third free end being curved and having a convex side bearing the contact surface of the at least one third finger.

* * * * *